United States Patent
Yamato et al.

(10) Patent No.: US 11,563,810 B2
(45) Date of Patent: Jan. 24, 2023

(54) SENSOR MANAGEMENT UNIT, SENSOR DEVICE, SENSOR MANAGEMENT METHOD, AND SENSOR MANAGEMENT PROGRAM

(71) Applicant: OMRON Corporation, Kyoto (JP)

(72) Inventors: Tetsuji Yamato, Yokohama (JP); Takeshi Naito, Tokyo (JP); Toshihiko Oda, Kusatsu (JP); Taiji Yoshikawa, Kizugawa (JP)

(73) Assignee: OMRON CORPORATION, Kyoto (JP)

( * ) Notice: Subject to any disclaimer, the term of this patent is extended or adjusted under 35 U.S.C. 154(b) by 64 days.

(21) Appl. No.: 16/632,893

(22) PCT Filed: Jul. 17, 2018

(86) PCT No.: PCT/JP2018/026629
§ 371 (c)(1),
(2) Date: Jan. 22, 2020

(87) PCT Pub. No.: WO2019/031161
PCT Pub. Date: Feb. 14, 2019

(65) Prior Publication Data
US 2021/0160322 A1 May 27, 2021

(30) Foreign Application Priority Data

Aug. 9, 2017 (JP) .............................. JP2017-153899
Nov. 30, 2017 (JP) .............................. JP2017-230052

(51) Int. Cl.
*H04L 67/12* (2022.01)
*G16Y 40/30* (2020.01)

(52) U.S. Cl.
CPC .............. *H04L 67/12* (2013.01); *G16Y 40/30* (2020.01)

(58) Field of Classification Search
CPC ..... H04L 67/12; H04L 67/2804; G16Y 40/30; G16Y 40/35
See application file for complete search history.

(56) References Cited

U.S. PATENT DOCUMENTS

2011/0113339 A1* 5/2011 Lee .......................... G06F 16/25
715/736
2011/0270797 A1* 11/2011 Adams ..................... G06N 7/00
706/59

(Continued)

FOREIGN PATENT DOCUMENTS

| CN | 105378810 A | 3/2016 |
| JP | 2005-242534 A | 9/2005 |

(Continued)

OTHER PUBLICATIONS

Office Action dated Apr. 1, 2021 in a related Chinese patent application.

(Continued)

*Primary Examiner* — Jason D Recek
(74) *Attorney, Agent, or Firm* — Metrolex IP Law Group, PLLC

(57) ABSTRACT

A sensor management unit according to an aspect of the present invention includes: a sensing data acquisition portion configured to acquire sensing data obtained by a sensor observing a target; a metadata generating portion configured to generate, for the acquired sensing data, metadata indicating an attribute of the sensor; an identification code generating portion configured to generate a first identification code for identifying the sensing data, and a second identification code for identifying the metadata; and a communicating portion configured to transmit, to an external device, at least one of the sensing data to which the second identification code is added and the metadata to which the first identification code is added.

18 Claims, 13 Drawing Sheets

(56) References Cited

U.S. PATENT DOCUMENTS

| | | | |
|---|---|---|---|
| 2014/0259133 A1 | 9/2014 | Diaz et al. | |
| 2014/0278259 A1 | 9/2014 | Neeley et al. | |
| 2014/0372561 A1 | 12/2014 | Hisano | |
| 2015/0381737 A1 | 12/2015 | Quinn et al. | |
| 2017/0013047 A1* | 1/2017 | Hubbard | H04L 69/22 |
| 2018/0293587 A1 | 10/2018 | Oda | |
| 2018/0373956 A1 | 12/2018 | Yamato | |
| 2019/0028544 A1* | 1/2019 | Edgardh | H04L 67/12 |
| 2019/0258553 A1* | 8/2019 | Misumi | H04M 11/00 |
| 2020/0036772 A1* | 1/2020 | Xie | H04L 67/06 |

FOREIGN PATENT DOCUMENTS

| | | |
|---|---|---|
| JP | 5445722 B1 | 3/2014 |
| JP | 2017-84134 A | 5/2017 |
| JP | 2017-111501 A | 6/2017 |

OTHER PUBLICATIONS

Thomas Kothmayr et al: "Gathering Sensor Data in Home Networks with IPFIX", Feb. 17, 2010, pp. 131-146, XP019138708, ISBN:978-3-642-11916-3, Wireless Sensor Networks, Springer Berlin Heidelberg, Berlin, Heidelberg.

Extended European Search Report dated Nov. 20, 2020 in a counterpart European patent application.

International Search Report of PCT/JP2018/026629 dated Aug. 14, 2018.

Written Opinion of PCT/JP2018/026629 dated Aug. 14, 2018.

* cited by examiner

PROVIDER DATA CATALOG

- CATALOG NO.
- PROVIDER INFORMATION
- PROVISION CONDITIONS
- PROVISION PERIOD
- SENSOR SPECIFICATIONS (PERFORMANCE, ... )
- OBSERVATION CONTENT
- DATA SPECIFICATIONS
- FORM OF USE (OPERATION SETTINGS, INSTALLATION SITUATION, ... )
- ・・・

USER DATA CATALOG
- CATALOG NO.
- USER INFORMATION
- RECEIPT CONDITIONS
- USE PERIOD
- SENSOR SPECIFICATIONS (PERFORMANCE, ... )
- OBSERVATION CONTENT
- DATA SPECIFICATIONS
- FORM OF USE (OPERATION SETTINGS, INSTALLATION SITUATION, ... )
- ...

FIG. 12

| SENSING DATA ID | METADATA ID |
|---:|---:|
| ID_D0000 | ID_M0000 |
| ID_D0001 | ID_M0001 |
| ID_D0002 | ID_M0002 |
| ID_D0003 | ID_M0003 |
| ID_D0004 | ID_M0004 |
| ID_D0005 | ID_M0005 |
| ⋮ | ⋮ |

126

SENSOR MANAGEMENT UNIT, SENSOR DEVICE, SENSOR MANAGEMENT METHOD, AND SENSOR MANAGEMENT PROGRAM

TECHNICAL FIELD

The present invention relates to a sensor management unit, a sensor device, a sensor management method, and a sensor management program.

RELATED ART

Owing to recent advances in IoT (Internet of Things) technologies, mechanisms that accumulate various kinds of data, analyze the accumulated data, and feed back the acquired knowledge have begun to be utilized. As a result, the demand for sensing data obtained by sensors and the need for sharing such data are increasing, and the technology for enhancing the distributability of sensing data has been developed more actively.

For example, Patent Document 1 proposes a system for transmitting to a user's application sensing data obtained by a sensor from a sensor management device for managing the sensor. Specifically, the system proposed in Patent Document 1 acquires sensor-side metadata and app-side metadata. The sensor-side metadata is information regarding a sensor that outputs the sensing data. The app-side metadata is information regarding an application that uses the sensing data.

This system extracts sensors that meet a request from the application and can provide sensing data, by matching the sensor-side metadata with the app-side metadata. The system then transmits a data flow control command that specifies a sensor and an application that have been extracted through the matching, to the sensor management device that manages the sensor. Thus, the sensing data obtained by the sensor can be transmitted from the sensor management device that manages the sensor to the user's application.

Also, for example, Patent Document 2 proposes a system that adds, to output data that is output from a sensor, identification information for identifying the output data, type information indicating the type of the output data, format information indicating the format of the output data, or the like. According to this system, the output data can be identified and the type and format of the output data can be specified based on the information added to the output data that is output from the sensor.

RELATED ART DOCUMENTS

Patent Documents

Patent Document 1: Japanese Patent No. 5445722
Patent Document 2: JP 2005-242534A

SUMMARY OF THE INVENTION

Problem to be Solved by the Invention

The inventors of the present application have found the following problems regarding the aforementioned conventional technologies for distributing sensing data. That is to say, conventionally in the case of generating metadata indicating an attribute of a sensor for sensing data obtained by the sensor, the generated metadata is transmitted to an external device together with the corresponding sensing data. For this reason, if metadata is generated every time sensing data is obtained from a sensor, a problem arises in that the data traffic for transmitting the sensing data to the external device increases for the metadata added.

To address this issue and reduce data traffic for transmitting sensing data to the external device, it is conceivable to omit the generation of metadata at regular or irregular timings. With this method, however, a new problem arises in that the usability of metadata is lost at the timings of this omission. This also applies to the case where sensing data and metadata are interchanged. That is to say, the inventors of the present application have found a problem in that it is difficult to reduce the data traffic for transmitting sensing data and metadata without losing the usability of the sensing data and the metadata with the conventional technologies.

One aspect of the present invention has been made in view of the foregoing situation, and aims to provide a technology for reducing the data traffic for transmitting sensing data and metadata without losing the usability of the sensing data and the metadata.

Means for Solving the Problems

To solve the foregoing problems, the invention employs the following configurations.

That is to say, a sensor management unit according to an aspect of the present invention includes: a sensing data acquisition portion configured to acquire sensing data obtained by a sensor observing a target; a metadata generating portion configured to generate, for the acquired sensing data, metadata indicating an attribute of the sensor; an identification code generating portion configured to generate a first identification code for identifying the sensing data, and a second identification code for identifying the metadata; and a communicating portion configured to transmit, to an external device, at least one of the sensing data to which the second identification code is added and the metadata to which the first identification code is added.

With this configuration, when the sensing data is transmitted to the external device, the second identification code for identifying the metadata is transmitted together, and thus, the external device can acquire the metadata corresponding to the received sensing data as needed, based on the second identification code. Similarly, when the metadata is transmitted to the external device, the first identification code for identifying the sensing data is transmitted together, and thus, the external device can acquire the sensing data corresponding to the received metadata as needed, based on the first identification code. Accordingly, the usability of the sensing data and the metadata in the external device can be ensured by transmitting a combination of the second identification code and the sensing data or a combination of the first identification code and the metadata to the external device.

In addition, commonly, the data volume of the first identification code is smaller than the data volume of the sensing data itself, and the data volume of the second identification code is smaller than the data volume of the metadata itself. Thus, the respective data traffic in the case of transmitting a combination of the second identification code and the sensing data and the case of transmitting a combination of the first identification code and the metadata is smaller than the data traffic in the case of transmitting a combination of the sensing data and the metadata. Furthermore, the acquisition of the sensing data and the metadata based on the first identification code and the second identification code need not necessarily be always performed, and the number of times of this acquisition can be lowered.

Accordingly, according to this configuration, the data traffic for transmitting the sensing data and the metadata can be reduced without losing the usability of the sensing data and the metadata. Note that the type of the sensor need not be specifically limited, and may be selected as appropriate, depending on the embodiment. For example, the sensor may be an image sensor, an infrared sensor, a sound sensor, a light sensor, a pressure sensor, an air pressure sensor, a temperature sensor, or the like. Also, for example, the sensor may be an environmental sensor (air pressure, temperature, humidity sound pressure, sound, ultraviolet rays, illuminance, rainfall, gas etc.), a vital sensor (blood pressure, heart rate, electrocardiogram, body temperature, sleep (microwaves), activity, blood sugar level etc.), an in-vehicle sensor (image sensor, laser sensor, a sleep (microwaves) sensor etc.), a home security sensor (image sensor, infrared sensor, activity (sound) sensor, gas ($CO_2$ etc.) sensor, a current sensor, a smart meter (a sensor for measuring the amount of electric power consumed by appliances, illumination, or the like) etc.), or the like. Accordingly, sensing data may be image data, numerical data, sound data, language data, or the like, for example. The external device need not be specifically limited as long as it is a device capable of using the sensing data and the metadata that is other than the sensor management unit, and may be a user terminal or the like, for example. The content of the metadata need not be specifically limited as long as it indicates some kind of information relating to the sensor or sensing data obtained by the sensor, and may be decided as appropriate, depending on the embodiment.

In the sensor management unit according to the above aspect, the identification code generating portion may be configured to generate the first identification code and the second identification code, using a universal unique identifier (UUID) or a global unique identifier (GUID). According to this configuration, since the first identification code and the second identification code enable the sensing data and the metadata to be globally and uniquely specified, respectively, a sensor management unit that can be used together with other systems can be provided.

In the sensor management unit according to the above aspect, the metadata may include at least one of dynamic metadata indicating an attribute relating to a form of use of the sensor that may dynamically change over time, and processed metadata relating to a feature value of the sensing data, the processed metadata being generated by analyzing the sensing data.

The dynamic metadata indicates an attribute relating to the form of use of the sensor that may dynamically changes over time. The processed metadata is generated by analyzing the sensing data. Accordingly, if the timing of obtaining the sensing data differs, the content of the generated dynamic metadata and processed metadata may differ.

For this reason, it is preferable that the dynamic metadata and the processed metadata are generated every time the sensing data is obtained. However, if the dynamic metadata and the processed metadata are generated every time the sensing data is obtained, the data volume of the dynamic metadata and the processed metadata increases, and thus, the data traffic for transmitting the sensing data and the metadata increases.

In this regard, according to this configuration, even in this case where the data volume of the metadata is likely to increase, the data traffic for transmitting the sensing data and the metadata can be lowered by using the first identification code and the second identification code. That is to say, the present technology, which lowers the data traffic for transmitting the sensing data and the metadata by using the first identification code and the second identification code, is more effective in the case where the data volume of the metadata is likely to increase due to the metadata including at least one of the dynamic metadata and the processed metadata.

Note that the attribute relating to the form of use of the sensor indicated by the dynamic metadata may be, for example, an attribute relating to operation settings of the sensor, an attribute relating to the situation in which the sensor is installed, or the like. The attribute relating to operation settings of the sensor is, for example, a set value of a measurement range, a set value of the resolution in the measurement range, a set value of a sampling frequency, or the like. The attribute relating to the situation in which the sensor is installed is, for example, the angle at which the sensor is installed, the temperature around the sensor, the distance between the sensor and an observation target, or the like.

Also, the type of analysis processing performed when the processed metadata is generated need not be specifically limited, and may be selected as appropriate, depending on the embodiment. For example, the analysis processing may be labeling processing, calculation processing for deriving the amount of change, calculation processing for deriving a vector value, conversion processing for making the unit, scale, or the like uniform, cleansing processing for removing data other than a true value of the sensing data, filtering processing using a filter such as a LPF (Low Pass Filter), a HPF (High Pass Filter), a BPF (Band Pass Filter), or the like. The feature value obtained as the processed metadata through the analysis indicates a feature of the sensing data. The type of feature value need not be specifically limited as long as it can indicate a feature of the sensing data, and may be selected as appropriate, depending on the embodiment. For example, the feature value may be a label, an amount of change, a vector value, an outlier value, or the like.

In the sensor management unit according to the above aspect, if the sensor management unit receives, from the external device, a request to transmit the sensing data specified by the designated first identification code, the communicating portion may transmit, to the external device, the sensing data specified by the designated first identification code, and if the sensor management unit receives, from the external device, a request to transmit the metadata specified by the designated second identification code, the communicating portion may transmit, to the external device, the metadata specified by the designated second identification code. According to this configuration, a sensor management unit can be provided that can transmit the sensing data and then transmit corresponding metadata as needed, and can transmit the metadata and then transmit corresponding sensing data as needed.

The sensor management unit according to the above aspect may further include a metadata management unit configured to manage the generated metadata in association with the sensing data. According to this configuration, a sensor management unit can be provided that can appropriately manage the sensing data and the metadata.

A sensor device according to an aspect of the present invention includes the sensor management unit according to any of the above-described modes, and the sensor. According to this configuration, a sensor device can be provided in which the data traffic for transmitting the sensing data and the metadata is reduced without losing the usability of the sensing data and the metadata.

Note that another mode of the sensor management unit according to the above modes may be an information processing method for realizing the above-described configurations, a program, or a storage medium that includes this program stored therein and can be read by a computer or other devices, machines, or the like. Here, a storage medium that can be read by a computer or the like is a medium in which information such as a program is accumulated by means of an electric, magnetic, optical, mechanical, or chemical action.

For example, a sensor management method according to an aspect of the present invention is a computer-implemented sensor management method including: a step of acquiring sensing data obtained by a sensor observing a target; a step of generating, for the acquired sensing data, metadata indicating an attribute of the sensor; a step of generating a first identification code for identifying the sensing data, and a second identification code for identifying the metadata; and a step of transmitting, to an external device, at least one of the sensing data to which the second identification code is added and the metadata to which the first identification code is added.

Also, for example, a sensor management program according to an aspect of the present invention is a sensor management program for causing a computer to carry out: a step of acquiring sensing data obtained by a sensor observing a target; a step of generating, for the acquired sensing data, metadata indicating an attribute of the sensor; a step of generating a first identification code for identifying the sensing data, and a second identification code for identifying the metadata; and a step of transmitting, to an external device, at least one of the sensing data to which the second identification code is added and the metadata to which the first identification code is added.

Effects of the Invention

According to the present invention, it is possible to provide a technology for reducing the data traffic for transmitting the sensing data and the metadata without losing the usability of the sensing data and the metadata.

BRIEF DESCRIPTION OF THE DRAWINGS

FIG. 7A schematically shows an example of a provider data catalog according to the embodiment.

FIG. 7B schematically shows an example of a user data catalog according to the embodiment.

FIG. 12 schematically shows an example of management data according to the embodiment.

EMBODIMENTS OF THE INVENTION

Hereinafter, an embodiment according to one aspect of the invention (hereinafter referred to also as "this embodiment") will be described with reference to the drawings. However, this embodiment described below is merely an example of the invention in all respects. Needless to say, various improvements and modifications can be made within the scope of the invention. That is to say, when the present invention is carried out, a specific configuration appropriate for an embodiment may also be employed as appropriate. Note that, although in this embodiment data is described using natural language, more specifically, the data is in the form of quasi-language, commands, parameters, machine language, or the like that can be recognized by a computer.

§ 1 Example Application

Figure 1:
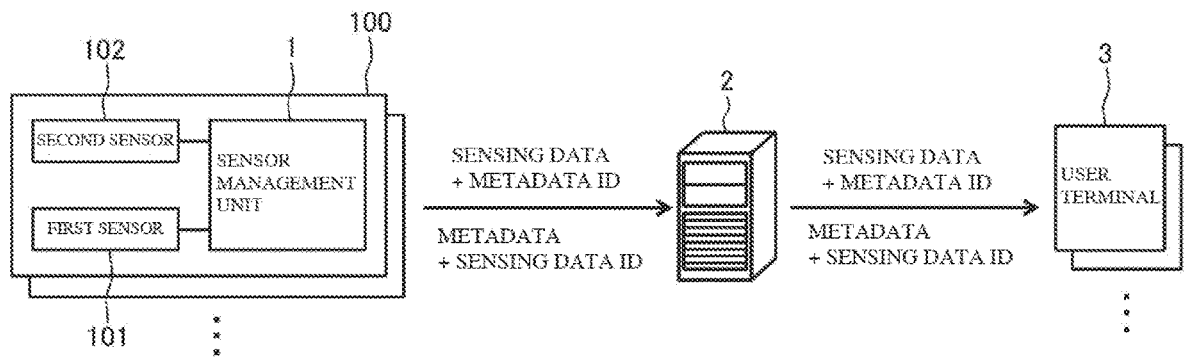
FIG. 1 schematically shows an example of a scenario to which the present invention is applied.

First, an example of a scenario to which the present invention is applied will be described with reference to FIG. 1. FIG. 1 schematically shows an example of a scenario in which a sensor device 100 is used according to this embodiment. In the example shown in FIG. 1, the sensor device 100 according to this embodiment is used as a provider that provides sensing data to a user terminal 3 of a user. However, the method for using the sensor device 100 according to this embodiment is not limited to this example, and may be decided as appropriate, depending on the embodiment.

The sensor device 100 according to this embodiment includes a first sensor 101 for observing a target, a second sensor 102 for observing the form of use of the first sensor 101, and a sensor management unit 1 that is connected to the sensors (101, 102). The first sensor 101 is an example of a "sensor" of the present invention. The second sensor 102 may be referred to as a "sub-sensor". The type of sensors (101, 102) may be selected as appropriate in accordance with an observation target.

The sensor management unit 1 according to this embodiment is an information processing apparatus that is configured to manage sensing data (later-described first sensing data 121) obtained by the first sensor 101. Specifically, the sensor management unit 1 acquires sensing data obtained by the first sensor 101 observing a target. Next, the sensor management unit 1 generates, for the acquired sensing data, metadata (later-described metadata 123 to 125) that indicates attributes of the first sensor 101.

The content of the metadata need not be specifically limited as long as it indicates some kind of information regarding the first sensor 101 or the sensing data obtained by the first sensor 101, and may be decided as appropriate, depending on the embodiment. For example, the metadata may include at least one of dynamic metadata (later-described dynamic metadata 124) and processed metadata (later-described processed metadata 125).

Dynamic metadata indicates an attribute relating to the form of use of the first sensor 101 that may dynamically change over time. Dynamic metadata can be generated based on sensing data (later-described second sensing data 122) that is obtained by the second sensor 102 observing the form of use of the first sensor 101, for example. Processed metadata relates to a feature value of the sensing data obtained by the first sensor 101, and can be generated by analyzing the sensing data.

Furthermore, the sensor management unit 1 generates a sensing data ID (later-described sensing data ID 128) for identifying the sensing data obtained by the first sensor 101, and a metadata ID (later-described metadata ID 129) for identifying the metadata. The sensing data ID is an example of a "first identification code" of the present invention. The metadata ID is an example of a "second identification code" of the present invention.

Then, the sensor management unit 1 transmits, to an external device, at least one of the sensing data to which the metadata ID is added and the metadata to which the sensing data ID is added. Thus, the sensor management unit 1 provides the sensing data and the metadata to the external device. The external device to which the sensing data and the metadata are to be provided need not be specifically limited as long as it is a device other than the sensor management unit 1 (sensor device 100), and may be selected as appropriate, depending on the embodiment. In this embodiment, each user terminal 3 is an example of an "external device" of the present invention.

Specifically, in this embodiment, the sensing data and the metadata are provided from the sensor device 100 via a network server 2 to the user terminal 3 of the user. A plurality of sensor devices 100 and a plurality of user terminals 3 are connected via a network (not shown) to the network server 2. The type of the network may be selected, as appropriate, from the Internet, a wireless communication network, a mobile communication network, a telephone network, a dedicated network, or the like, for example.

The network server 2 matches providers (sensor devices 100) that provide sensing data with a user (application software executed in the user terminal 3 etc.) using a later-described method, and extracts providers capable of providing sensing data that meets a request from the user. Then, the network server 2 permits distribution of the sensing data from the sensor devices 100 to any matching user terminal 3. Thus, in this embodiment, the sensing data and the metadata are provided from the sensor devices 100 to an appropriate user terminal 3.

As described above, when the sensor management unit 1 (sensor device 100) according to this embodiment transmits the sensing data to the user terminal 3, the sensor management unit 1 transmits the metadata ID for identifying the metadata together. Thus, the user terminal 3 can acquire the metadata corresponding to the received sensing data as needed, based on the received metadata ID. Similarly, when the sensor management unit 1 (sensor device 100) according to the embodiment transmits the metadata to the user terminal 3, the sensing data ID for identifying the sensing data is transmitted together. Thus, the user terminal 3 can acquire the sensing data corresponding to the received metadata as needed, based on the sensing data ID. Accordingly, according to this embodiment, a combination of the metadata ID and the sensing data or a combination of the sensing data ID and the metadata is transmitted to the user terminal 3, and thus, the usability of the sensing data and the metadata in this user terminal 3 can be ensured.

Usually, the data volume of the sensing data ID is smaller than the data volume of the sensing data itself, and the data volume of the metadata ID is smaller than the data volume of the metadata itself. For this reason, the respective data traffic in the case of transmitting a combination of the metadata ID and the sensing data and the case of transmitting a combination of the sensing data ID and the metadata is smaller than the data traffic in the case of transmitting a combination of the sensing data and the metadata. Furthermore, the acquisition of the sensing data and the metadata based on the sensing data ID and the metadata ID need not necessarily be always performed, respectively, and the number of times of this acquisition can be lowered. Accordingly, according to this embodiment, the data traffic for transmitting the sensing data and the metadata can be reduced without losing the usability of the sensing data and the metadata.

§ 2 Example Configuration

Hardware Configuration
Sensor Management Unit (Sensor Device)

Figure 2:
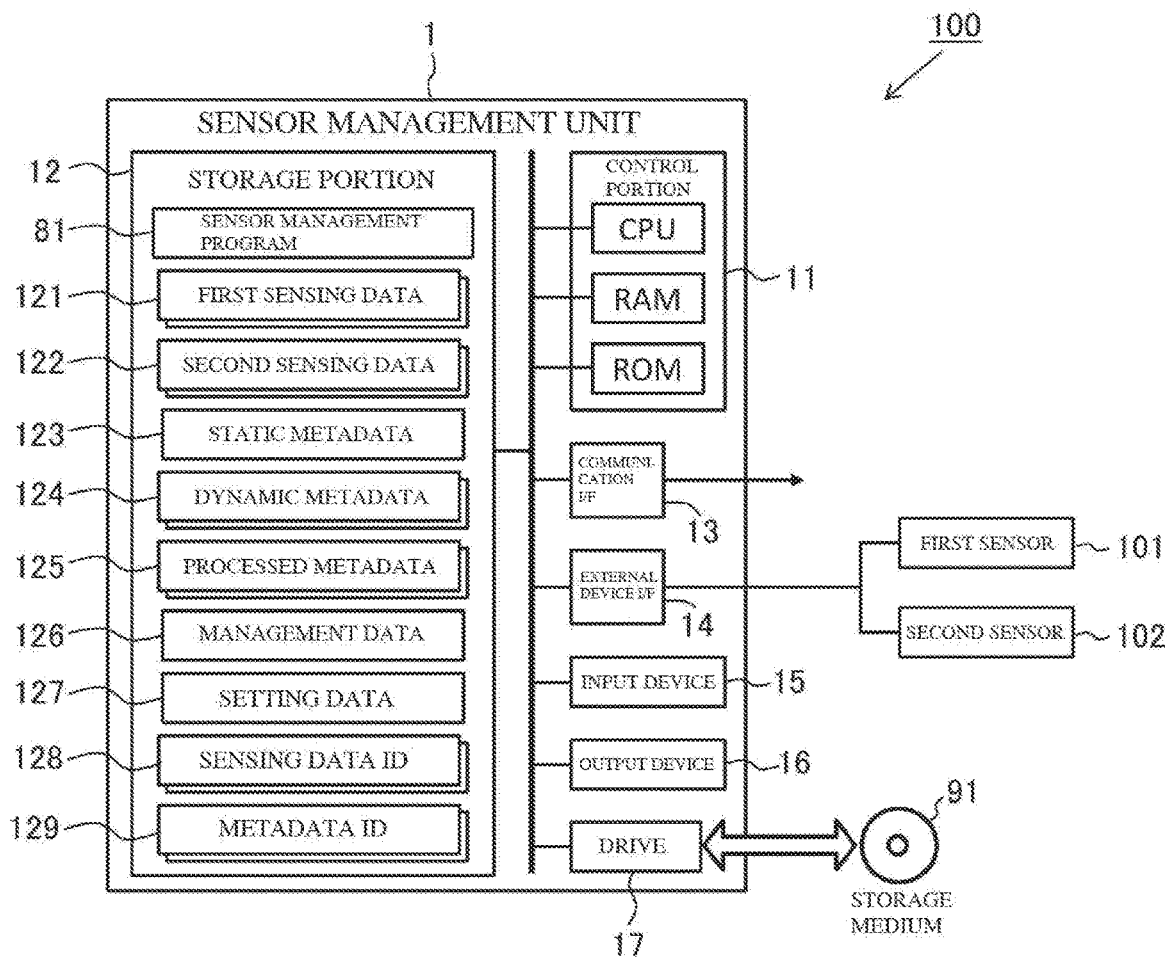
FIG. 2 schematically shows an example of a hardware configuration of a sensor management unit according to an embodiment.

Next, an example of a hardware configuration of the sensor management unit 1 according to this embodiment will be described with reference to FIG. 2. FIG. 2 schematically shows an example of the hardware configuration of the sensor management unit 1 according to this embodiment.

As shown in FIG. 2, the sensor management unit 1 according to this embodiment is a computer in which a control portion 11, a storage portion 12, a communication interface 13, an external device interface 14, an input device 15, an output device 16, and a drive 17 are electrically connected to each other. Note that, in FIG. 2, the communication interface and the external device interface are denoted as "communication I/F" and "external device I/F", respectively.

The control portion 11 includes a CPU (Central Processing Unit), which is a hardware processor, a RAM (Random Access Memory), a ROM (Read Only Memory), and so on, and is configured to perform information processing based on programs and various data. The storage portion 12 is an example of a "memory", and is constituted by a hard disk drive, a solid-state drive, or the like, for example. In this embodiment, a sensor management program 81, first sensing data 121, second sensing data 122, static metadata 123, dynamic metadata 124, processed metadata 125, management data 126, setting data 127, sensing data IDs 128, metadata IDs 129, and so on, are stored in the storage portion 12.

The first sensing data 121 is obtained by the first sensor 101 observing a target. The second sensing data 122 is obtained by the second sensor 102 observing the form of use of the first sensor 101. The metadata 123 to 125 indicates attributes of the first sensor 101, and is associated with the first sensing data 121. The management data 126 includes information indicating a correspondence relationship between the first sensing data 121 and the metadata 123 to 125 based on the association. The setting data 127 includes information indicating operation settings of the first sensor 101. The sensing data IDs 128 are used to identify the first sensing data 121. The metadata IDs 129 are used to identify the metadata 123 to 125 that is associated with the corresponding first sensing data 121. The sensor management program 81 includes a command to cause the sensor management unit 1 to perform later-described information processing (FIG. 8) for managing the first sensing data 121 and the metadata 123 to 125. The details will be described later.

The communication interface 13 is, for example, a wired LAN (Local Area Network) module, a wireless LAN module, or the like, and is an interface for performing wired or wireless communication via a network. The sensor management unit 1 communicates data with the network server 2 via this communication interface 13.

The external device interface 14 is, for example, a USB (Universal Serial Bus) port, a dedicated port, or the like, and is an interface for connecting to an external device. The type and number of external device interfaces 14 may be selected as appropriate in accordance with the type and number of external devices to be connected. In this embodiment, the sensor management unit 1 is connected to the sensors (101, 102) via the external device interface 14.

The type of the first sensor 101 need not be specifically limited, and may be selected as appropriate, depending on the embodiment. The first sensor 101 may be, for example, an image sensor, an infrared sensor, a sound sensor, a light sensor, a pressure sensor, an air pressure sensor, a temperature sensor, or the like. Also, the first sensor 101 may be, for example, an environmental sensor, a vital sensor, an in-vehicle sensor, a home security sensor, or the like. An environmental sensor is a sensor configured to measure or detect environmental information regarding air pressure, temperature, humidity, sound pressure, sound, ultraviolet rays, illuminance, rainfall, gas, or the like. A vital sensor is a sensor configured to measure or detect vital information, such as blood pressure, heart rate, electrocardiogram, body temperature, sleeping state (microwaves), activity, and blood sugar level. An in-vehicle sensor is a sensor mounted in a vehicle, such as an image sensor, a laser sensor, or a sleep (microwaves) sensor. A home security sensor is a sensor configured to measure or detect information regarding home security, such as an image sensor, an infrared sensor, an activity (sound) sensor, a gas (CO2 etc.) sensor, a current sensor, or a smart meter (a sensor for measuring the amount of electric power consumed by appliances, illumination, or the like). Accordingly, the first sensing data 121 obtained by the first sensor 101 is, for example, image data, numerical data, sound data, language data, or the like. The first sensor 101 is arranged as appropriate so as to be able to measure the state of a target.

The type of the second sensor 102 need not be specifically limited as long as it can observe the form of use of the first sensor 101, and may be selected as appropriate, depending on the embodiment. The second sensor 102 may be, for example, a temperature sensor, a GPS sensor, an acceleration sensor, an air pressure sensor, a magnetic field sensor, a gyro sensor, or the like. This second sensor 102 is arranged as appropriate so as to be able to observe the form of use of the first sensor 101. For example, if a temperature sensor is employed as the second sensor 102, the temperature around the first sensor 101 can be observed by the second sensor 102 by arranging the second sensor 102 near the first sensor 101. Also, if, for example, a gyro sensor is employed as the second sensor 102, the orientation (e.g. direction) of the first sensor 101 can be observed by the second sensor 102 by attaching the second sensor 102 to a housing (not shown) of the first sensor 101.

Note that, in the example in FIG. 2, one first sensor 101 and one second sensor 102 are connected to the sensor management unit 1. However, the number of first sensors 101 and second sensors 102 to be connected to the sensor management unit 1 need not be limited to one, and may alternatively be two or more. A plurality of first sensors 101 may be connected to the sensor management unit 1. Also, a plurality of second sensors 102 may also be used to observe the form of use of one first sensor 101. The number of sensors (101, 102) to be connected to the sensor management unit 1 may be decided as appropriate, depending on the embodiment.

The input device 15 is, for example, a device for making input, such as a mouse or a keyboard. The output device 16 is, for example, a device for making output, such as a display or a speaker. The user who is to provide sensing data can operate the sensor management unit 1 using the input device 15 and the output device 16.

The drive 17 is, for example, a CD drive, a DVD drive, or the like, and is a drive device for loading a program stored in a storage medium 91. The type of the drive 17 may be selected as appropriate, depending on the type of the storage medium 91. The aforementioned sensor management program 81 may also be stored in this storage medium 91.

The storage medium 91 is a medium for accumulating information such as a program by means of an electric, magnetic, optical, mechanical, or chemical action, such that computers, or other devices, machines, or the like can read the recorded information such as a program. The sensor management unit 1 may acquire the sensor management program 81 from this storage medium 91.

Here, FIG. 2 shows a disk-type storage medium such as a CD or a DVD as an example of the storage medium 91. However, the type of the storage medium 91 is not limited to the disk type, and may also be another type than the disk type. Examples of a storage medium of a type other than the disk type may include a semiconductor memory, such as a flash memory.

Note that, as for the specific hardware configuration of the sensor management unit 1, constituent elements may be omitted, replaced, or added as appropriate, depending on the embodiment. For example, the control portion 11 may also include a plurality of hardware processors. The hardware processor may be constituted by a microprocessor, an FPGA (field-programmable gate array), a DSP (digital signal processor), or the like. The storage portion 12 may be constituted by a RAM and a ROM included in the control portion 11. The input device 15 and the output device 16 may be omitted. If each of the sensors (101, 102) includes a communication interface, the sensor management unit 1 may be connected to the sensors (101, 102) via the communication interface 13, rather than the external device interface 14. In this case, the external device interface 14 may be omitted. Although, in FIG. 2, the sensor management unit 1 is constituted by one information processing apparatus, the sensor management unit 1 may be constituted by a plurality of information processing apparatuses. If the sensor management unit 1 is constituted by a plurality of information processing apparatuses, the hardware configuration of each of the information processing apparatuses may, but need not, coincide with each other. The sensor management unit 1 may be an information processing apparatus designed exclusively for providing service, or may also be a general-purpose desktop PC (personal computer), a tablet PC, a smartphone, a mobile phone other than a smartphone, a PLC (programmable logic controller), or the like.

Network Server

Figure 3:
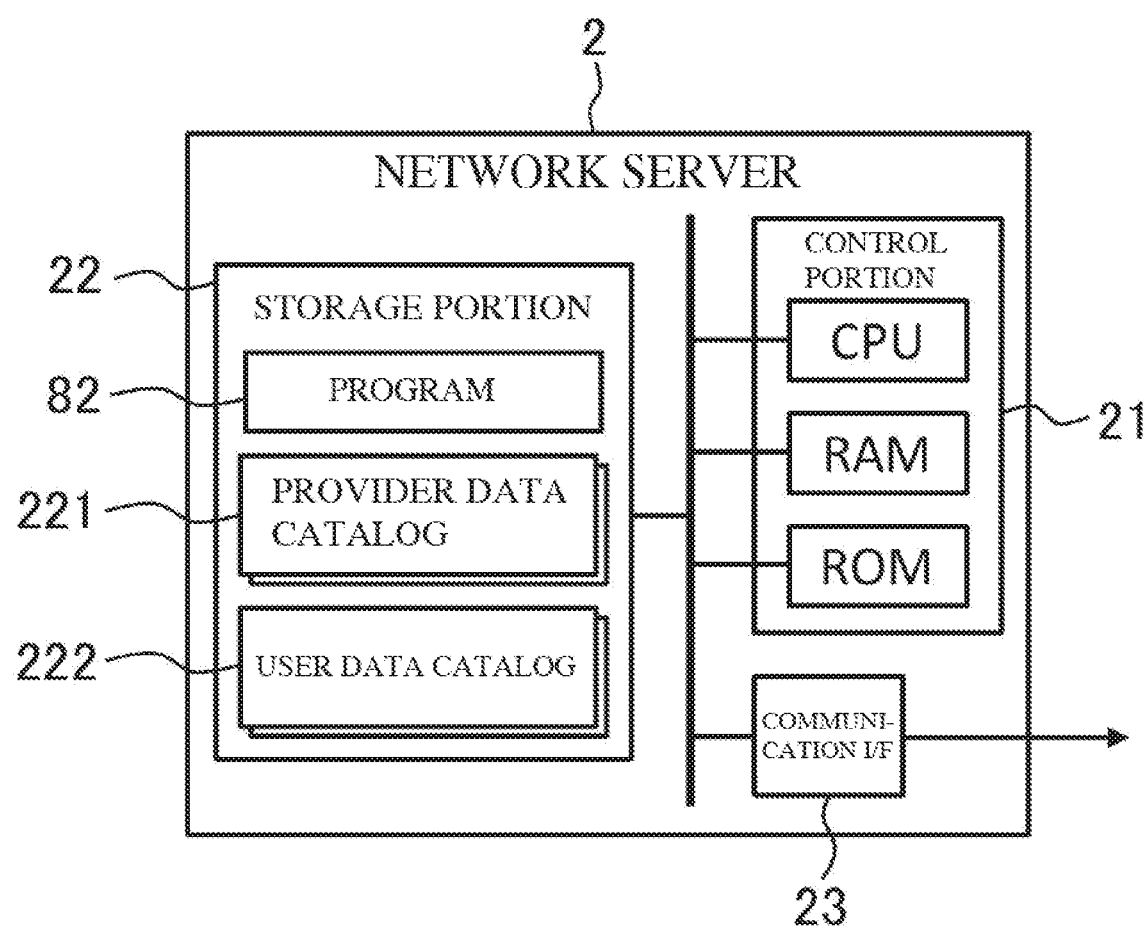
FIG. 3 schematically shows an example of a hardware configuration of a network server according to the embodiment.

Next, an example of a hardware configuration of the network server 2 according to this embodiment will be described with reference to FIG. 3. FIG. 3 schematically shows an example of the hardware configuration of the network server 2 according to this embodiment.

As shown in FIG. 3, the network server 2 according to this embodiment is a computer in which a control portion 21, a storage portion 22, and a communication interface 23 are electrically connected to each other. Note that, in FIG. 3, the communication interface is denoted as "communication I/F", similarly to FIG. 2.

The control portion 21 includes a CPU, which is a hardware processor, as well as a RAM, a ROM, and so on, similarly to the aforementioned control portion 11, and is configured to perform various kinds of information processing based on programs and data. The storage portion 22 is constituted by a hard disk drive, a solid-state drive, or the like, for example, and stores a program 82, a provider data catalog 221, a user data catalog 222, and so on.

The program 82 includes a command to cause the network server 2 to perform later-described information processing (FIG. 11) for matching a provider and a user. The provider data catalog 221 is prepared for each provider, and includes information indicating sensing data (first sensing data 121) that can be provided by a sensor (first sensor 101) in each sensor device 100. Meanwhile, the user data catalog 222 is prepared for each user, and includes information indicating sensing data desired by the user. The provider data catalog 221 and the user data catalog 222 are used in matching between a provider and a user. The details will be described later.

The communication interface 23 is an interface for performing communication via a network, similarly to the aforementioned communication interface 13. The communication interface 23 is a wired LAN module, a wireless LAN module, or the like, for example. The network server 2 performs data communication with sensor devices 100 and user terminals 3 via this communication interface 23.

Note that, as for the specific hardware configuration of the network server 2, constituent elements may be omitted, replaced, or added as appropriate, depending on the embodiment. For example, the control portion 21 may include a plurality of hardware processors. The hardware processor may be constituted by a microprocessor, an FPGA, or the like. The storage portion 22 may be constituted by a RAM and a ROM included in the control portion 21. The network server 2 may further include an input device and an output device as user interfaces. Also, the network server 2 may be an information processing apparatus designed exclusively for the service, or may also be a general-purpose server device, a general-purpose PC, or the like.

User Terminal

Figure 4:
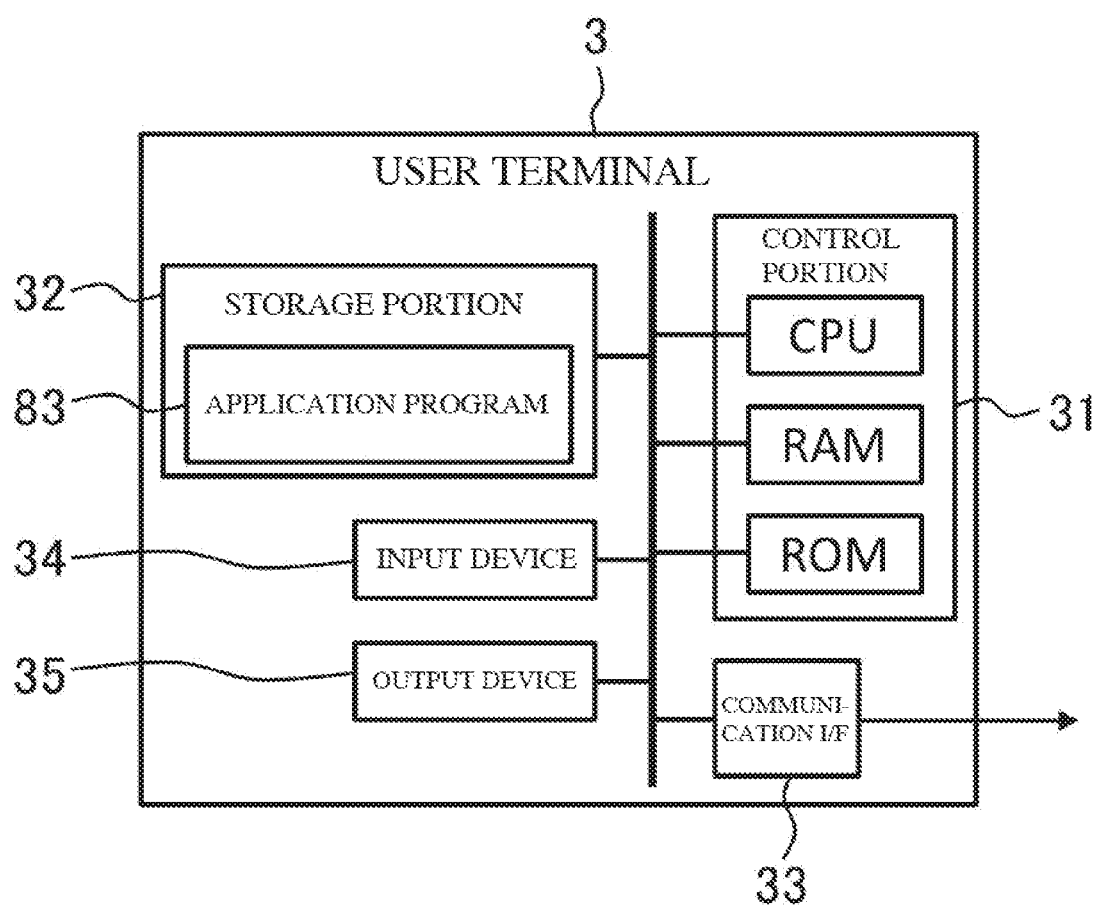
FIG. 4 schematically shows an example of a hardware configuration of a user terminal according to the embodiment.

Next, an example of a hardware configuration of the user terminal 3 according to this embodiment will be described with reference to FIG. 4. FIG. 4 schematically shows an example of the hardware configuration of a user terminal 3 according to this embodiment.

As shown in FIG. 4, the user terminal 3 according to this embodiment is a computer in which a control portion 31, a storage portion 32, a communication interface 33, an input device 34, and an output device 35 are electrically connected to each other. Note that, in FIG. 4, the communication interface is denoted as "communication I/F", similarly to FIGS. 2 and 3.

The control portion 31 includes a CPU, which is a hardware processor, as well as a RAM, a ROM, and so on, similarly to the aforementioned control portions (11, 22), and is configured to perform various kinds of information processing based on programs and data. The storage portion 32 is constituted by a hard disk drive, a solid-state drive, or the like, for example, and stores an application program 83, and the like.

The application program 83 includes a command for causing the control portion 31 to perform predetermined information processing, and uses sensing data (first sensing data 121) provided by each user terminal 3. The type of the application program 83 need not be specifically limited, and may be selected as appropriate, depending on the embodiment.

The communication interface 33 is an interface for performing communication via a network, similarly to the aforementioned communication interfaces (13, 23). The communication interface 33 is a wired LAN module, a wireless LAN module, or the like, for example. The user terminal 3 communicates data with the network server 2 via this communication interface 33.

The input device 34 is, for example, a device for making input, such as a mouse or a keyboard, similarly to the aforementioned input device 15. The output device 35 is, for example, a device for making output, such as a display or a speaker, similarly to the aforementioned output device 16. The user of sensing data can operate the user terminal 3 using the input device 34 and the output device 35.

Note that, as for the specific hardware configuration of the user terminal 3, constituent elements may be omitted, replaced, or added as appropriate, depending on the embodiment. For example, the control portion 31 may also include a plurality of hardware processors. The hardware processor may be constituted by a microprocessor, an FPGA, or the like. The storage portion 32 may be constituted by a RAM and a ROM included in the control portion 31. The user terminal 3 may be an information processing apparatus designed exclusively for the service, or may also be a general-purpose desktop PC, a tablet PC, a smartphone, a mobile phone other than a smartphone, or the like.

Software Configuration

Figure 5:
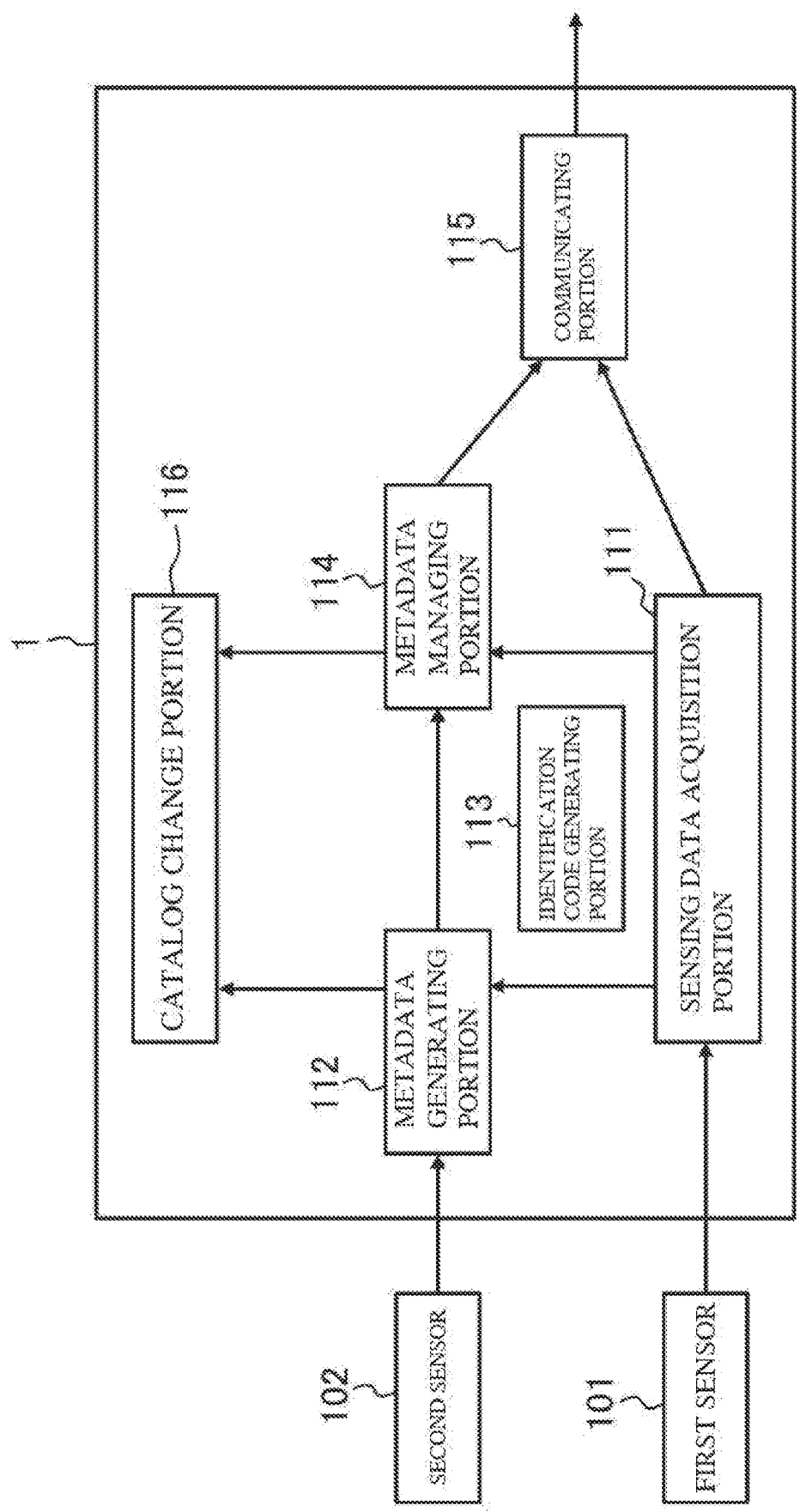
FIG. 5 schematically shows an example of a software configuration of the sensor management unit according to the embodiment.

Next, an example of a software configuration of the sensor management unit 1 according to this embodiment will be described with reference to FIG. 5. FIG. 5 schematically shows an example of the software configuration of the sensor management unit 1 according to this embodiment.

The control portion 11 of the sensor management unit 1 loads the sensor management program 81 stored in the storage portion 12 to the RAM. The control portion 11 then causes the CPU to interpret the sensor management program 81 loaded to the RAM, and performs information processing based on the interpretation while controlling the constituent elements. As a result, as shown in FIG. 5, the sensor management unit 1 according to this embodiment is configured as a computer that includes, as software modules, the sensing data acquisition portion 111, a metadata generating portion 112, an identification code generating portion 113, a metadata managing portion 114, a communicating portion 115, and a catalog change portion 116.

The sensing data acquisition portion 111 acquires the first sensing data 121 obtained by the first sensor 101 observing a target. The metadata generating portion 112 generates, for the acquired first sensing data 121, metadata indicating attributes of the first sensor 101. In this embodiment, the metadata generating portion 112 generates three types of metadata, namely the static metadata 123, the dynamic metadata 124, and the processed metadata 125, as metadata indicating attributes of the first sensor 101.

The static metadata 123 is configured to indicate an attribute relating to the specifications of the first sensor 101 that do not change over time. That is to say, information held as the static metadata 123 basically relates to an attribute that always takes a constant value and will not change in accordance with the form of use.

The dynamic metadata 124 is configured to indicate an attribute of the first sensor 101 at the point in time when the first sensing data 121 was obtained, the attribute relating to the form of use of the first sensor 101 that may dynamically change over time. The attribute relating to the form of use of the first sensor 101 indicated by the dynamic metadata 124 is, for example, an attribute relating to operation settings of the first sensor 101, an attribute relating to the situation in which the first sensor 101 is installed, or the like.

Information held as the dynamic metadata 124 is not limited to information that always takes a constant value, and relates to an attribute that may change in accordance with the form of use. That is to say, the dynamic metadata 124 indicates information representing an attribute that may be an attribute where a change is to be checked (or tracked) regarding the form of use of the first sensor 101, in order to determine the reliability, availability, or the like of the sensing data, for example. In this embodiment, the metadata generating portion 112 generates the dynamic metadata 124 based on, for example, the second sensing data 122 obtained by the second sensor 102 observing the form of use of the first sensor 101.

The processed metadata 125 relates to a feature value of the acquired first sensing data 121. The metadata generating portion 112 generates the processed metadata 125 by analyzing the acquired first sensing data 121.

The identification code generating portion 113 generates sensing data IDs 128 for identifying the first sensing data 121, and metadata IDs 129 for identifying the metadata 123 to 125. The metadata managing portion 114 manages the generated metadata 123 to 125 in association with the first sensing data 121.

The communicating portion 115 transmits at least one of the first sensing data 121 to which the metadata ID 129 is added and the metadata 123 to 125 to which the sensing data ID 128 is added, to an external device such as the user terminal 3. The catalog change portion 116 changes the content of the provider data catalog 221 held in the network server 2, in accordance with a change in the form of use of the first sensor 101.

The software modules of the sensor management unit 1 will be described in detail in an example operation, which will be described later. Note that this embodiment describes an example in which all of the software modules of the sensor management unit 1 are realized by a general-purpose CPU. However, the method for realizing the software modules need not be limited to this example. Some or all of the aforementioned software modules may be realized by one or more dedicated processors. As for the software configuration of the sensor management unit 1, software modules may be omitted, replaced, or added as appropriate, depending on the embodiment.

§ 3 Example Operation

Matching Processing

Figure 6:
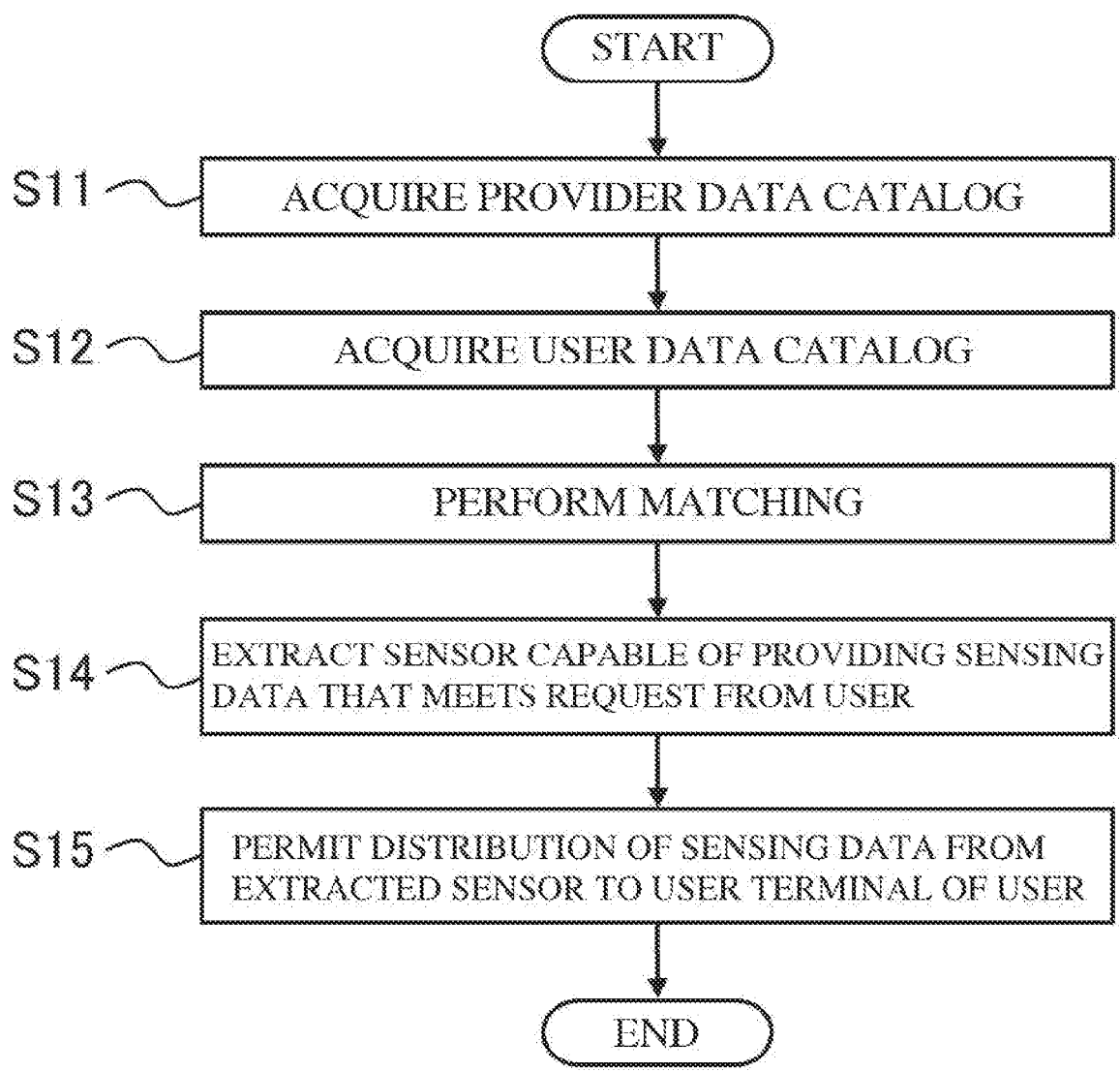
FIG. 6 shows an example of a processing procedure for matching a provider of sensing data with a user thereof according to the embodiment.

Next, a processing procedure relating to matching between a provider and a user performed by the network server 2 will be described with reference to FIG. 6. FIG. 6 shows an example of a matching processing procedure performed by the network server 2 according to this embodiment. However the matching processing procedure described below is merely an example, and the processes may be modified to the extent possible. As for the processing procedure described below, steps may be omitted, replaced, and added as appropriate, depending on the embodiment.

Steps S11 and S12

First, in step S11, the control portion 21 of the network server 2 acquires the provider data catalog 221 indicating the sensing data that can be provided by the sensor devices 100. In the next step S12, the control portion 21 acquires the user data catalog 222 indicating the sensing data desired by a user.

FIG. 7A schematically shows an example of the provider data catalog 221 according to this embodiment. The provider data catalog 221 according to this embodiment includes information such as the catalog number, provider information, provision conditions, the provision period, sensor specifications, observation content, data specifications, and the form of use. In step S11, the control portion 21 may generate the provider data catalog 221, as appropriate, by acquiring various kinds of information that is to be registered in the provider data catalog 221.

Specifically, the catalog number is a number for identifying the provider data catalog 221. When generating the provider data catalog 221, the control portion 21 may also generate, as appropriate, a number that is not used for other provider data catalogs 221, and set the generated number as the catalog number.

The provider information is information for specifying a provider of the sensing data, and may include the name (personal name or organization name) of the provider, a contact address of the provider, or the like, for example. Information representing the provision conditions provides conditions under which provision of the sensing data is permitted. The provision conditions may include, for example, conditions regarding the usage (commercial/non-commercial/unlimited) of the sensing data, the scope of provision (allowed/not allowed to be provided to a third party), access right (copy not permitted/copy permitted/alteration permitted/manipulation permitted), whether or not personal information is contained, whether or not anonymously processed information is contained, the type of payment of usage charge for the sensing data, or the like. Information representing the provision period provides a period during which provision of the sensing data is permitted (e.g. start date and end date of provision). When generating the provider data catalog 221, the control portion 21 may also acquire information representing provider information, provision conditions, and the provision period by accepting input or designation thereof from the provider via each sensor device 100 or other information processing apparatuses.

Information representing sensor specifications indicates an attribute relating to the specifications of the first sensor 101, and may include, for example, information regarding performance of the first sensor 101, device information, information regarding initial installation conditions, or the like. Information regarding performance of the first sensor 101 may include, for example, information such as the sensitivity limit, the dynamic range, the settable range of spatial resolution, and the settable range of sampling frequency, of the first sensor 101. The device information regarding the first sensor 101 may include, for example, information such as the name of the first sensor 101 and a description of the first sensor 101. Information regarding the initial installation conditions of the first sensor 101 may include, for example, information such as a proper noun indicating the location where the first sensor 101 is installed.

Information regarding the observation content indicates an attribute of observation performed using the first sensor 101, and may include, for example, the name of observation (e.g. environmental observation), a description of the observation, the name of an observation target (e.g. office A), a description of the observation target, the name of an observation index (e.g. temperature, humidity etc.), a description of the observation index, or the like. Information representing data specifications indicates an attribute regarding the specifications of the first sensing data 121 obtained by the first sensor 101, and may include, for example, information such as the name (temperature value, maximum power consumption value etc.) of an observation value indicated by the first sensing data 121, a description of the observation value, and the unit of the observation value. When generating the provider data catalog 221, the control portion 21 may also acquire information representing sensor specifications, the observation content, and data specifications from the static metadata 123 associated with the first sensors 101 of each sensor devices 100 or the first sensing data 121.

Information regarding the form of use indicates an attribute of the first sensor 101 that may change in accordance with the form of use, and may include, for example, information regarding operation settings of the first sensor 101 and information regarding the situation in which the first sensor 101 is installed. Information regarding operation settings of the first sensor 101 may include, for example, information such as a set value of the measurement range of the first sensor 101, a set value of the resolution in the measurement range, and a set value of the sampling frequency. Information regarding the situation in which the first sensor 101 is installed may include, for example, information such as the angle at which the first sensor 101 is installed, the temperature around the first sensor 101, and the distance between the first sensor 101 and an observation target. When generating the provider data catalog 221, the control portion 21 may also acquire information regarding the form of use from the dynamic metadata 124 associated with each sensor device 100 or the first sensing data 121.

Meanwhile, FIG. 7B schematically shows an example of the user data catalog 222 according to this embodiment. The user data catalog 222 according to this embodiment includes information such as the catalog number, user information, receipt conditions, the use period, sensor specifications, observation content, data specifications, and the form of use. In step S12, the control portion 21 may also generate the user data catalog 222, as appropriate, by accepting input or designation thereof from the user via each user terminal 3 or another information processing apparatus and acquiring various kinds of information to be registered in the user data catalog 222.

The catalog number is akin to the catalog number in the provider data catalog 221. Information representing user information, receipt conditions, the use period, sensor specifications, observation content, data specifications, and the form of use correspond to information representing provider information, provision conditions, the provision period, sensor specifications, observation content, data specifications, and the form of use in the aforementioned provider data catalog 221, respectively.

The user information is information for specifying the user of the sensing data. Information representing receipt conditions provides various conditions under which provision of the sensing data is permitted. Information representing the use period provides a period during which the sensing data is to be provided or provision of the sensing data is desired (e.g. start date and end date of use). Information representing sensor specifications indicates an attribute of the specifications of the sensor from which provision of the sensing data is desired. Information regarding the observation content indicates an attribute of observation regarding which provision of the sensing data is desired. Information representing data specifications indicates an attribute relating to the specifications of the sensing data the provision of which is desired. Information regarding the form of use indicates an attribute that may change in accordance with the form of use of the sensor from which provision of the sensing data is desired. Items provided by the information representing user information, receipt conditions, the use period, sensor specifications, observation content, data specifications, and the form of use may be similar to the information representing provider information, provision conditions, the provision period, sensor specifications, observation content, data specifications, and the form of use, respectively, in the aforementioned provider data catalog 221.

Note that the provider data catalog 221 and the user data catalog 222 need not be generated by the network server 2. The provider data catalog 221 may alternatively be generated by each sensor device 100 or another information processing apparatus of a provider. The user data catalog 222 may alternatively be generated by each user terminal 3 or another information processing apparatus of a user. In this case, the control portion 21 may also acquire the provider data catalog 221 via a network from each sensor device 100 or the other information processing apparatus of the provider. Also, the control portion 21 may acquire the user data catalog 222 via a network from each user terminal 3 or the other information processing apparatus of the user.

Steps S13 and S14

In the next step S13, the control portion 21 matches providers with users by checking the items in the provider data catalog 221 against the items in the user data catalog 222. In the next step S14, a sensor device 100 (first sensor 101) capable of providing sensing data (first sensing data 121) that meets the request from the user is extracted based on the matching result.

As an example of a matching method, the control portion 21 checks the provision conditions, the provision period, sensor specifications, observation content, data specifications, and the form of use in the provider data catalog 221 against the receipt conditions, the use period, sensor specifications, observation content, data specifications, and the form of use in the user data catalog 222, and determines whether or not corresponding items match. If, as a result of the determination, all or some of the items match, the control portion 21 extracts the sensor device 100 corresponding to the provider data catalog 221 as a sensor device capable of providing sensing data that meets the request from the user corresponding to the user data catalog 222. On the other hand, if not, the control portion 21 determines that the sensor device 100 corresponding to the provider data catalog 221 is not a sensor device capable of providing sensing data that meets the request from the user corresponding to the user data catalog 222. However, the matching method need not be limited to this example, and may be decided as appropriate, depending on the embodiment.

Step S15

In the next step S15, the control portion 21 permits distribution of the sensing data (first sensing data 121) from the extracted sensor device 100 to the target user terminal 3. As an example of this permission processing, the control portion 21 transmits, to the extracted sensor device 100, a data flow permission command indicating that transmission of sensing data to the target user terminal 3 is permitted. In response to this, the sensor device 100 starts to transmit the first sensing data 121 obtained by the first sensor 101 observing the target, to the target user terminal 3 designated by the data flow permission command. Upon permission of data distribution to the extracted sensor devices 100 being completed, the control portion 21 ends the matching processing according to this example operation.

Processing for Managing Sensing Data

Figure 8:
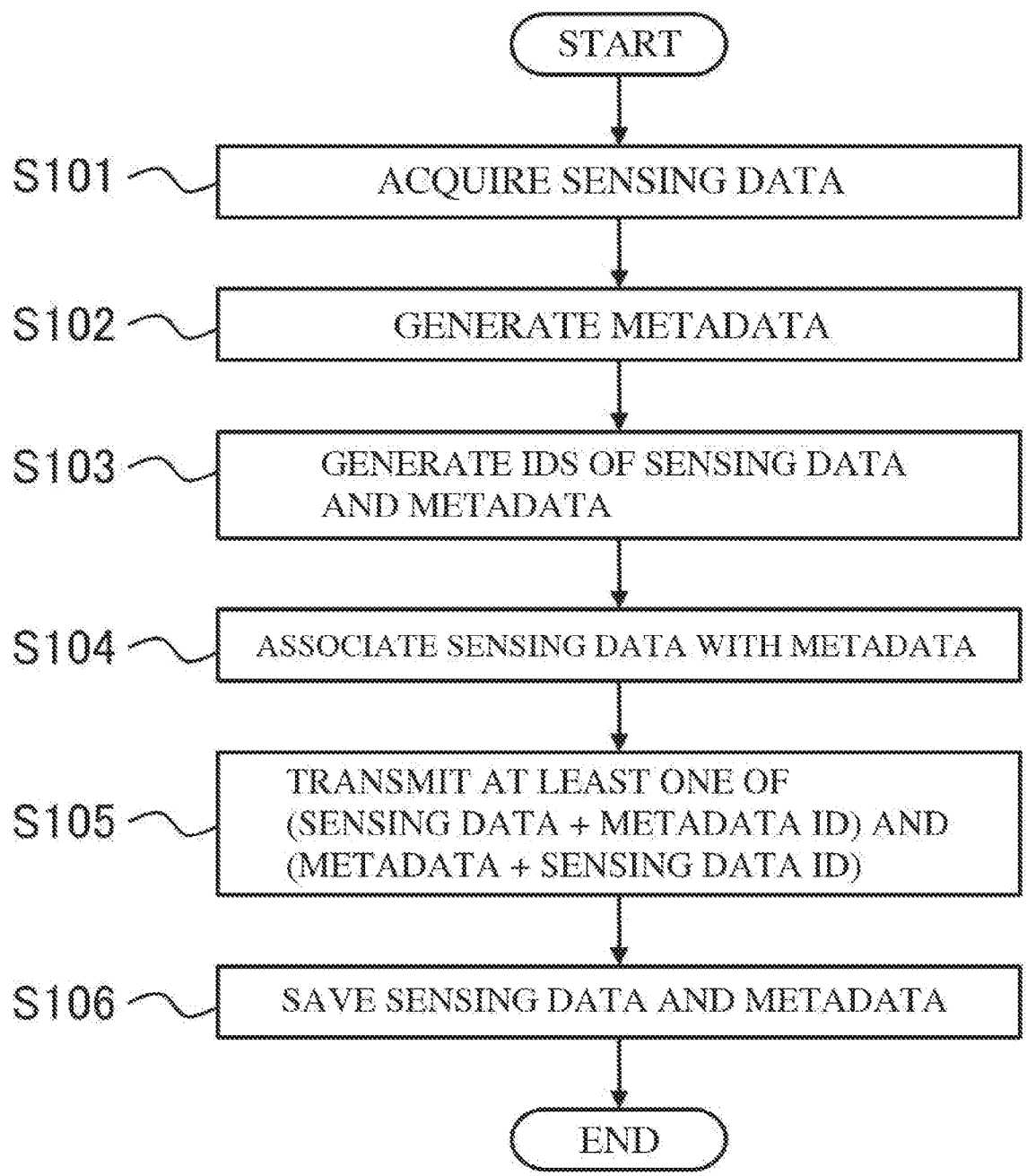
FIG. 8 shows an example of a processing procedure performed by the sensor management unit according to the embodiment.
Figure 9:
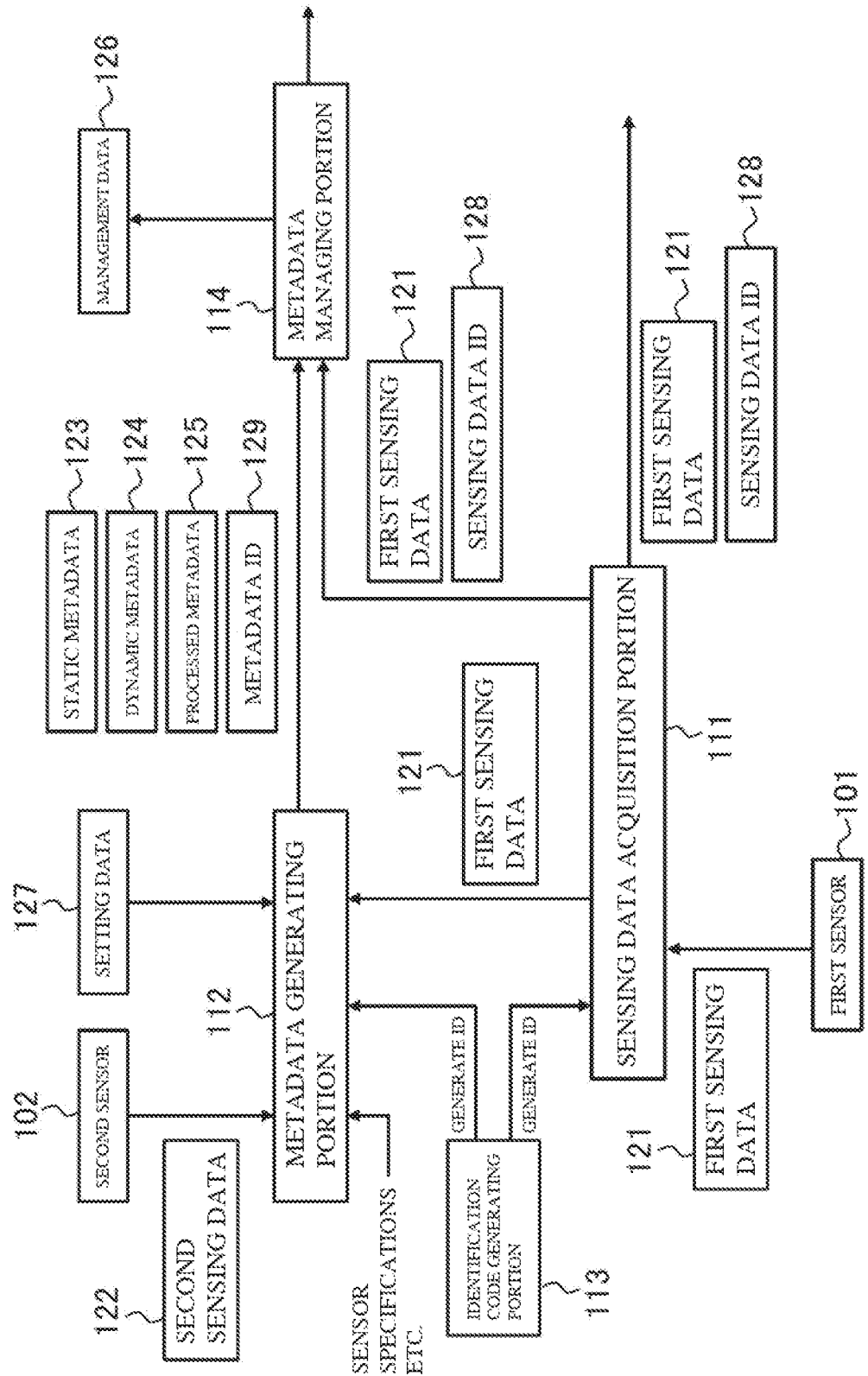
FIG. 9 shows an example of processes to generate metadata performed by the sensor management unit according to the embodiment.

Next, a description will be given, with reference to FIGS. 8 and 9, of a processing procedure for managing the first sensing data 121 performed by the sensor management unit 1. FIG. 8 shows an example of a processing procedure for managing the first sensing data 121 performed by the sensor management unit 1 according to this embodiment. FIG. 9 schematically shows an example of a process by which the first sensing data 121 is managed by the sensor management unit 1 according to this embodiment. The processing procedure described below is an example of a "sensor management method" of the present invention. However, the processing procedure described below is merely an example, and the processes may be modified to the extent possible. As for the processing procedure described below, steps may be omitted, replaced, and added as appropriate, depending on the embodiment.

Step S101

First, in step S101, the control portion 11 of the sensor management unit 1 operates as the sensing data acquisition portion 111, and acquires the first sensing data 121 obtained by the first sensor 101 observing a target.

In this embodiment, the sensor management unit 1 holds the setting data 127 indicating operation settings of the first sensor 101. Thus, the control portion 11 references the setting data 127 and specifies the operation settings of the first sensor 101.

Figure 10:
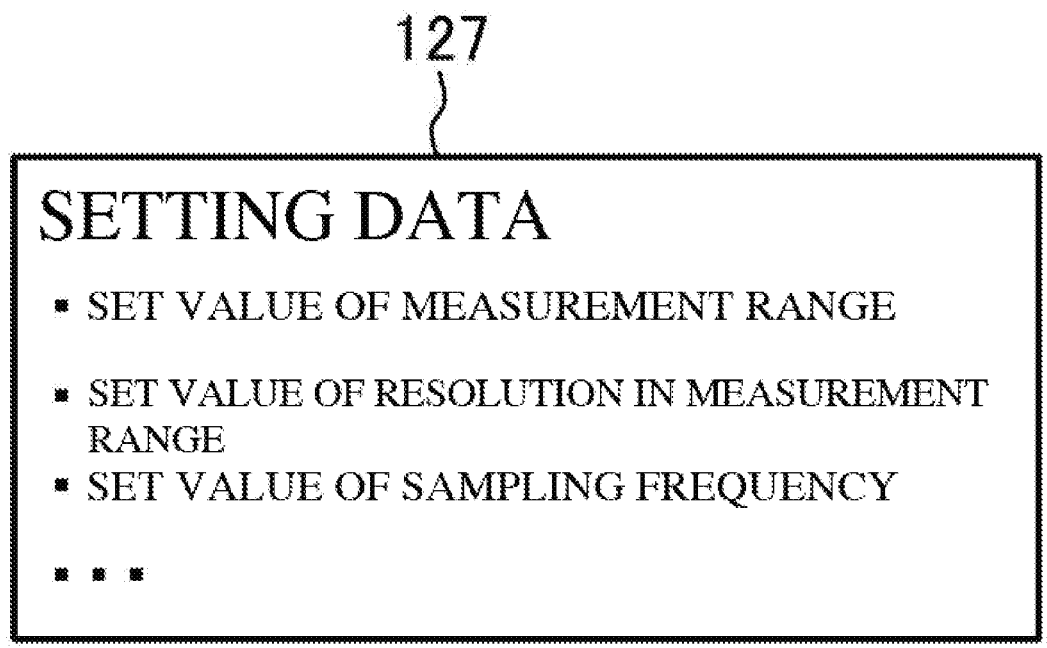
FIG. 10 schematically shows an example of setting data according to the embodiment.

FIG. 10 schematically shows an example of the setting data 127 according to this embodiment. The setting data 127 includes, as information representing the operation setting of the first sensor 101, information such as a set value of the measurement range, a set value of the resolution in the measurement range, and a set value of the sampling frequency, for example. The control portion 11 controls operations of the first sensor 101 based on these pieces of information.

Specifically, the control portion 11 controls operations of the first sensor 101 based on the set value of the measurement range and the set value of the resolution indicated by the setting data 127. The control portion 11 then sets the set value indicated by the setting data 127 as the sampling frequency, and performs sampling processing on a signal output from the first sensor 101. Thus, the control portion 11 can acquire the first sensing data 121.

However, the method for acquiring the first sensing data 121 need not be limited to this example, and may be decided as appropriate, depending on the embodiment. For example, the aforementioned control and sampling processing of the first sensor 101 may alternatively be performed by another information processing apparatus. In this case, the control portion 11 may acquire the first sensing data 121 from the other information processing apparatus. Upon acquiring the first sensing data 121, the control portion 11 advances the processing to the next step S102.

Note that the first sensing data 121 may be configured as time-series data with a fixed time width, or may be configured to indicate an observation result at one point in time. The configuration of the first sensing data 121 need not be specifically limited, and may be decided as appropriate, depending on the embodiment.

Step S102

In the next step S102, the control portion 11 operates as the metadata generating portion 112, and generates the static metadata 123, the dynamic metadata 124, and the processed metadata 125 for the first sensing data 121 acquired in step S101. Upon generating the metadata 123 to 125, the control portion 11 advances the processing to the next step S103.

(1) Static Metadata

The static metadata 123 is configured to indicate an attribute relating to the specifications of the first sensor 101 that do not change over time. As long as the static metadata 123 is thus configured, the content thereof may be decided as appropriate, depending on the embodiment. The static metadata 123 may include, for example, information such as an attribute relating to performance of the first sensor 101, an attribute relating to device information regarding the first sensor 101, and an attribute relating to initial installation conditions of the first sensor 101. The control portion 11 may acquire information corresponding to respective items from the first sensor 101 or another information processing apparatus that holds information regarding the specifications of the first sensor 101, and generate the static metadata 123 based on the acquired information.

(2) Dynamic Metadata

The dynamic metadata 124 is configured to indicate an attribute of the first sensor 101 at the point in time when the first sensing data 121 was obtained, the attribute relating to the form of use of the first sensor 101 that may dynamically change over time. As long as the dynamic metadata 124 is thus configured, the content thereof may be decided as appropriate, depending on the embodiment. Attributes relating to the form of use of the first sensor 101 indicated by the dynamic metadata 124 may include, for example, an attribute relating to operation settings of the first sensor 101, an attribute relating to the situation in which the first sensor 101 is installed, or the like.

The attribute relating to an operation setting of the first sensor 101 is, for example, a set value of the measurement range, a set value of the resolution in the measurement range, a set value of the sampling frequency, or the like. In this embodiment, information regarding the operation settings of the first sensor 101 is stored as the setting data 127 in the storage portion 12. The control portion 11 may acquire information regarding the operation settings of the first sensor 101 by referencing the setting data 127, and generate the dynamic metadata 124 based on the acquired information.

The attribute relating to the situation in which the first sensor 101 is installed is, for example, the angle at which the first sensor 101 is installed, the temperature around the first sensor 101, the distance between the first sensor 101 and an observation target, or the like. In this embodiment, the form of use of the first sensor 101 is monitored by the second sensor 102, which is connected to the sensor management unit 1. The control portion 11 may generate the dynamic metadata 124 based on the second sensing data 122 obtained by the second sensor 102 observing the form of use of the first sensor 101.

As a specific example, if the second sensor 102 is a temperature sensor and is installed in a region around the first sensor 101, the second sensing data 122 obtained by the second sensor 102 indicates the temperature around the first sensor 101. The control portion 11 may acquire this second sensing data 122 and generate, as the dynamic metadata 124, data indicating the temperature around the first sensor 101 based on the acquired second sensing data 122.

If the second sensor 102 is a gyro sensor and is attached to a housing of the first sensor 101, the second sensing data 122 obtained by the second sensor 102 indicates the tilt of the first sensor 101. The control portion 11 may acquire this second sensing data 122 and generate, as the dynamic metadata 124, data indicating the angle at which the first sensor 101 is installed based on the acquired second sensing data 122.

Note that the configuration of the dynamic metadata 124 need not be limited to this example, and may be decided as appropriate, depending on the embodiment. For example, at least one of the information representing an attribute relating to the operation settings of the first sensor 101 and the information representing an attribute relating to the installation situation may be omitted. The dynamic metadata 124 may also include information representing an attribute relating to the form of use of the first sensor 101, other than information representing an attribute relating to the operation settings of the first sensor 101 and information representing an attribute relating to the installation situation.

The control portion 11 may also generate the dynamic metadata 124 without depending on the setting data 127 and the second sensing data 122. For example, the control portion 11 may also generate the dynamic metadata 124 based on the first sensing data 121. As a specific example, if the first sensor 101 is an infrared sensor, the control unit 11 may identify the distance between the first sensor 101 and the observation target by analyzing the first sensing data 121, and generate data indicating the specified distance as the dynamic metadata 124.

The dynamic metadata 124 is configured to indicate an attribute relating to the form of use of the first sensor 101 at the point in time when the first sensing data 121 was obtained. For this reason, it is preferable that the point in time of the form of use of the first sensor 101 indicated by the dynamic metadata 124 coincides with the point in time at which the first sensing data 121 was obtained. However, the "point in time when the first sensing data 121 was obtained" need not be accurate.

That is to say, the point in time of the form of use of the first sensor 101 indicated by the dynamic metadata 124 and the point in time when the first sensing data 121 was obtained need not completely coincide with each other, and may be shifted from each other unless this shift critically affects the use of the dynamic metadata 124. The state where the point in time of the form of use of the first sensor 101 indicated by the dynamic metadata 124 and the point in time when the first sensing data 121 was obtained are shifted from each other to the extent that this shift does not critically affect the use of the dynamic metadata 124 is also included in "the point in time when the first sensing data 121 was obtained".

Accordingly, the control portion 11 may acquire the setting data 127 to be used to generate the dynamic metadata 124 and the second sensing data 122 at the same timing as the timing of acquiring the first sensing data 121, or may acquire the setting data 127 and the second sensing data 122 at a timing different from the timing of acquiring the first sensing data 121. Note that the method for acquiring the second sensing data 122 may be similar to the method for acquiring the first sensing data 121 in the aforementioned step S101.

(3) Processed Metadata

The processed metadata 125 is configured to indicate a feature value of the first sensing data 121 acquired in step S101. As long as the processed metadata 125 is thus configured, the content thereof may be decided as appropriate, depending on the embodiment. The control portion 11 can generate the processed metadata 125 by performing predetermined analysis processing on the first sensing data 121 acquired in step S101.

Note that the type of the predetermined analysis processing performed when generating the processed metadata 125 need not be specifically limited, and may be selected as appropriate, depending on the embodiment. The predetermined analysis processing may be, for example, labeling processing, calculation processing to derive the amount of change, calculation processing to derive a vector value, conversion processing, cleansing processing, filtering processing, or the like. Conversion processing is calculation processing for making the unit, scale, or the like uniform. Cleansing processing is calculation processing for eliminating data other than a true value of the sensing data. Filtering processing is calculation processing for applying a filter such as an LPF, an HPF, or a BPF to the sensing data.

The type of the feature value obtained as the processed metadata 125 through the analysis processing need not be specifically limited as long as the feature value indicates a feature of the first sensing data 121 acquired in step S101, and may be selected as appropriate, depending on the embodiment. The feature value obtained as the processed metadata 125 may be, for example, a label, the amount of change, a vector value, an outlier value, or the like.

(4) Others

Note that the content of the dynamic metadata 124 and the processed metadata 125 depends on the timing of acquiring the first sensing data 121 and the content thereof. For this reason, the control portion 11 newly generates the dynamic metadata 124 and the processed metadata 125 for the acquired first sensing data 121 every time processing in steps S101 and S102 is repeated.

Meanwhile, the content of the static metadata 123 does not depend on the first sensing data 121. For this reason, after creating the static metadata 123 once, the control portion 11 need not newly generate the static metadata 123 for the same first sensor 101. That is to say, the control portion 11 may generate the static metadata 123 only when performing step S102 for the first time.

The timing of generating the static metadata 123 may differ from the timing of performing step S102. Before performing step S101, for example, the control portion 11 may connect the first sensor 101 to the sensor management unit 1, and generate the static metadata 123 when configuring initial settings to register the first sensor 101 to the sensor management unit 1.

Step S103

In the next step S103, the control portion 11 operates as the identification code generating portion 113, and generates the sensing data ID 128 for identifying the first sensing data 121 acquired in step S101. Also, the control portion 11 generates the metadata ID 129 for identifying the metadata 123 to 125 generated in step S102.

In this embodiment, one sensing data ID 128 is assigned to one piece of the first sensing data 121 acquired in step S101. On the other hand, one metadata ID 129 is assigned to one combination of the static metadata 123, the dynamic metadata 124, and the processed metadata 125 corresponding to the first sensing data 121. However, the correspondence relationship between the first sensing data 121 and the sensing data ID 128 and the correspondence relationship between the metadata 123 to 125 and the metadata ID 129 need not be limited to those in this example, and may be decided as appropriate, depending on the embodiment.

For example, the sensing data ID 128 and the metadata ID 129 may be constituted by symbols such as letters, numbers, and signs. In this case, the control portion 11 may also generate, as appropriate, as a new sensing data ID 128, any symbol sequence that has not been assigned to other first sensing data 121, i.e. that differs from symbol sequences of sensing data IDs 128 that are paired with other first sensing data 121. Then, the control portion 11 may pair the new generated sensing data ID 128 with the first sensing data 121 acquired in step S101.

Similarly, the control portion 11 may generate, as anew metadata ID 129, any symbol sequence that has not been assigned to other combinations of the metadata 123 to 125, i.e. that differs from symbol sequences of metadata IDs 129 that are paired with other combinations of the metadata 123 to 125, as appropriate. Then, the control portion 11 may pair the new generated metadata 129 with the combination of the metadata 123 to 125 generated in step S102.

Also, for example, to ensure compatibility with other systems, the sensing data ID 128 and the metadata ID 129 each may be constituted by a universal unique identifier (UUID) or a global unique identifier (GUID). In this case, the control portion 11 may acquire a UUID or a GUID from an external server device or the like as appropriate, and assign the acquired UUID or GUID to the sensing data ID 128 or the metadata ID 129. Thus, the control portion 11 can generate the sensing data ID 128 and the metadata ID 129 using a UUID or a GUID.

Note that the configuration of the sensing data ID 128 and the metadata ID 129 need not be limited to that in the above example, and may be decided as appropriate, depending on the embodiment. It is preferable that the sensing data ID 128 is configured to have a smaller data volume than the data volume of the first sensing data 121. It is also preferable that the metadata ID 129 is configured to have a smaller data volume than the total data volume of the metadata 123 to 125. Upon generating the sensing data ID 128 and the metadata ID 129, the control portion 11 advances the processing to the next step S104.

Step S104

In the next step S104, the control portion 11 operates as the metadata managing portion 114, and associates the metadata 123 to 125 generated in step S102 with the first sensing data 121 acquired in step S101.

In this embodiment, the control portion 11 associates the metadata 123 to 125 with the first sensing data 121, using the sensing data ID 128 and the metadata ID 129. The control portion 11 then updates the content of the management data 126 by adding information indicating the association result to the management data 126. Thus, the control portion 11 manages the correspondence relationship between the metadata 123 to 125 and the first sensing data 121.

Figure 11:
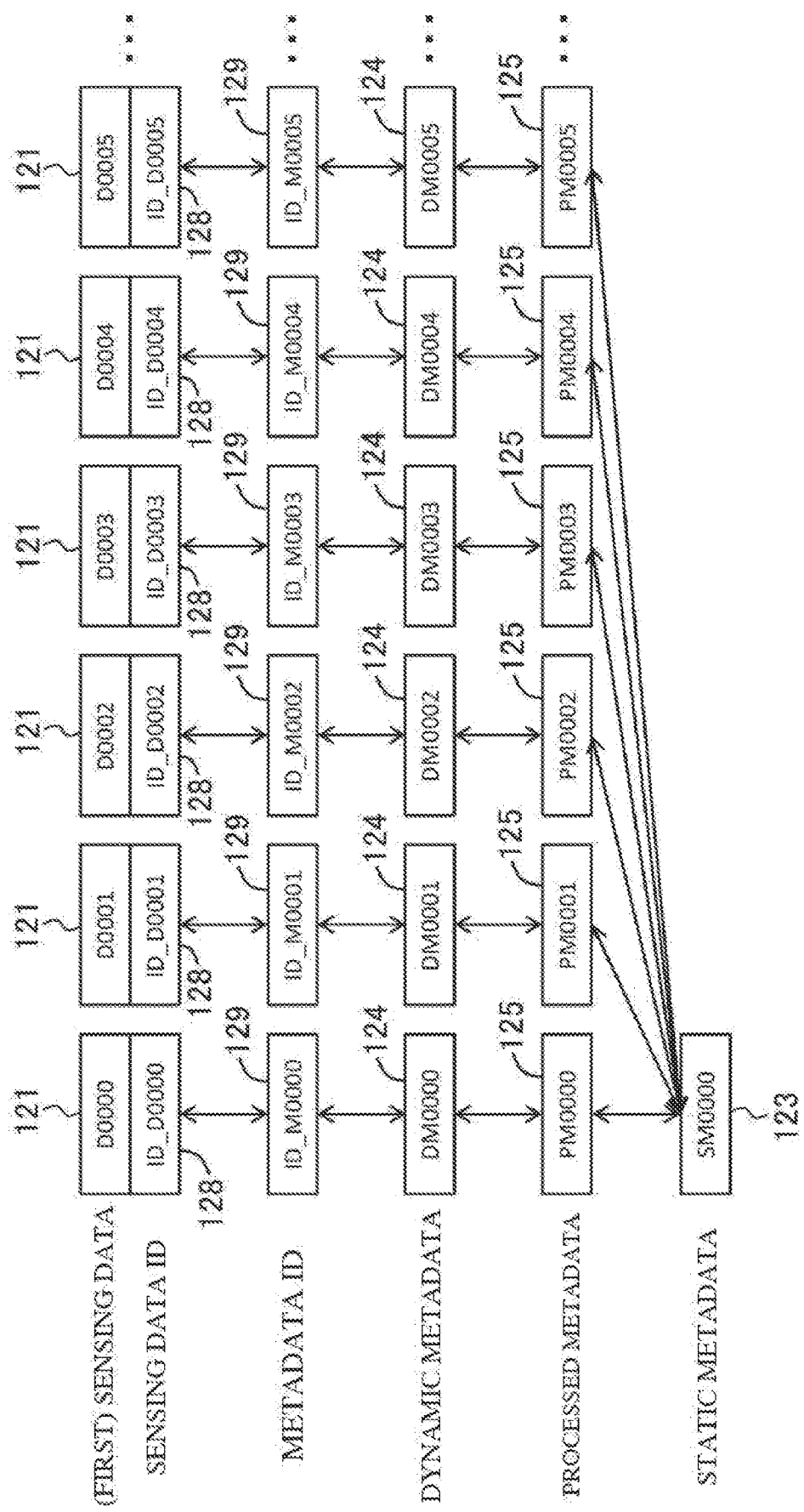
FIG. 11 schematically shows a correspondence relationship between (first) sensing data and various types of metadata according to the embodiment.

A specific example of the above-described processing will be described in detail, with reference to FIGS. 11 and 12. FIG. 11 schematically shows an example of a correspondence relationship between the first sensing data 121 and the metadata 123 to 125. FIG. 12 schematically shows an example of the management data 126 according to this embodiment. Note that FIGS. 11 and 12 show an example in which the dynamic metadata 124 and the processed metadata 125 are newly generated every time the first sensing data 121 is acquired, whereas the static metadata 123, once generated, is not newly generated thereafter.

In the example in FIG. 11, the first sensing data 121, such as "D0000", is acquired as a result of step S101 being performed repeatedly, and the sensing data ID 128, such as "ID_D0000", is accordingly associated with each piece of the first sensing data 121. Meanwhile, the dynamic metadata 124, such as "DM0000", and the processed metadata 125, such as "PM0000", is generated for each piece of the first sensing data 121 as a result of step S102 being performed repeatedly. Also, shared static metadata 123 "SM0000" is generated for each piece of the first sensing data 121. The metadata ID 129, such as "ID_M0000", is associated with the combination of the static metadata 123, the dynamic metadata 124, and the processed metadata 125 corresponding to each piece of the first sensing data 121.

In this case, the control portion 11 can associate each combination of the metadata 123 to 125 with a corresponding piece of first sensing data 121 by associating the corresponding sensing data ID 128 and metadata ID 129 with each other. In the example in FIG. 11, the combination of the static metadata 123 "SM0000", the dynamic metadata 124 "DM000n", and the processed metadata 125 "PM000n" is associated with the first sensing data 121 "D000n" (n is a number from 0 to 5), due to the sensing data ID 128 "ID_000n" and the metadata ID 129 "ID_M000n" being associated with each other.

The control portion 11 stores, as the management data 126, information indicating the correspondence relationship based on this association. In the example in FIG. 12, each record (row data) in the management data 126 indicates a correspondence relationship based on the association. Specifically, each record in the management data 126 has fields for storing the sensing data ID 128 and the metadata ID 129. The control portion 11 can add the information indicating the association result to the management data 126 by storing the associated IDs (128, 129) of the first sensing data 121 and the metadata 123 to 125 in the respective fields of a new record. Note that, in the example in FIG. 12, the management data 126 is expressed in a table format. However, the data format of the management data 126 need not be limited to such a table format, and may be selected as appropriate, depending on the embodiment.

Thus, the control portion 11 can associate the metadata 123 to 125 with the first sensing data 121. Also, a state can be achieved in which the correspondence relationship based on the association is managed by the management data 126. After the above processing has been completed, the control portion 11 advances the processing to the next step S105.

Step S105

In the next step S105, the control portion 11 operates as the control portion 115, and transmits at least one of the first sensing data 121 to which the metadata ID 129 is added and the metadata 123 to 125 to which the sensing data ID 128 is added, to the user terminal 3 for which distribution of the sensing data has been permitted by the network server 2.

From the viewpoint of a further reduction in the data traffic, it is preferable that, at a single timing, the control portion 11 only either transmits the first sensing data 121 to which the metadata ID 129 is added or transmits the metadata 123 to 125 to which the sensing data ID 128 is added. At this time, a configuration may be employed in which, in a first period, the control portion 11 transmits the first sensing data 121 to which the metadata ID 129 is added, and, in a second period different from the first period, the control portion 11 transmits the metadata 123 to 125 to which the sensing data ID 128 is added. Upon completing the transmission of the first sensing data 121 to which the metadata ID 129 is added or the transmission of the metadata 123 to 125 to which the sensing data ID 128 is added, the control portion 11 advances the processing to the next step S106.

Note that, to reduce the load associated with data transmission, in this step S105, the control portion 11 may transmit the metadata ID 129 and the first sensing data 121 using different communication ports. Similarly, the control portion 11 may transmit the sensing data ID 128 and the metadata 123 to 125 using different communication ports. For example, the control portion 11 may transmit the first sensing data 121 or the metadata 123 to 125 to a target user terminal 3 via a first communication port, and transmit the metadata ID 129 or the sensing data ID 128 to this target user terminal 3 via a second communication port different from the first communication port.

Each communication port is an end point for performing data communication. For example, the control portion 11 can communicate data with the user terminals 3 via different communication ports by designating different port numbers under the TCP (Transmission Control Protocol) or the UDP (User Datagram Protocol). However, the ports for transmitting the data (121, 123 to 125) and the IDs (128, 129) need not be limited to those in this example, and may be the same.

Also, the control portion 11 may transmit the first sensing data 121 to which the metadata ID 129 is added or the metadata 123 to 125 to which the sensing data ID 128 is added, to a target user terminal 3 via the network server 2, or may transmit it to the target user terminal 3 not via the network server 2. In the case of transmitting the data to the network server 2, this network server 2 transfers, to the target user terminal 3, the first sensing data 121 to which the metadata ID 129 is added or the metadata 123 to 125 to which the sensing data ID 128 is added that is received from a sensor management unit 1.

Step S106

In the next step S106, the control portion 11 stores the first sensing data 121 and the metadata 123 to 125 in the storage portion 12.

However, the timing of performing storage processing in this step S106 need not be limited to this example, and may be decided as appropriate, depending on the embodiment. For example, the control portion 11 may acquire the first sensing data 121, and then store this first sensing data 121 in the storage portion 12 at any timing. Also, the control portion 11 may generate the metadata 123 to 125 and then store the metadata 123 to 125 in the storage portion 12 at any timing.

Thus, the control portion 11 ends the series of processing according to this example operation. In the user terminal 3, the application program 83 can then use the first sensing data 121 or the metadata 123 to 125. After ending the series of processing according to this example operation, the control portion 11 may also perform processing again from the aforementioned step S101. That is to say, the control portion 11 may also repeatedly perform the series of processing in the aforementioned steps S101 to S106 until the observation of the target using the first sensor 101 ends.

Supplement

Note that the processing procedure for sensor management according to the above-described example operation may also be modified to the extent possible. For example, the series of processing in steps S101 to S104 and S106 and processing in step S105 may be performed at different timings. Processing for generating the sensing data ID 128 and processing for generating the metadata ID 129 may be performed in different steps. The control portion 11 may perform the associating processing in step S104 after performing the series of processing in steps S101 to S103 more than once.

If the content of the dynamic metadata 124 has changed while processing in steps S101 and S102 is repeatedly performed, the control portion 11 may operate as the catalog change portion 116, and transmit, to the network server 2, a command to change the content of the form of use of the provider data catalog 221 so as to conform to the content of the generated dynamic metadata 124. Thus, information regarding the latest form of use of the first sensor 101 can be reflected in the provider data catalog 221.

However, the method for updating the content of the form of use of the provider data catalog 221 need not be limited to this example. In the case where the metadata 123 to 125 is transmitted to the user terminals 3 via the network server 2, the network server 2 may change, without waiting for that command, information representing the form of use in the target provider data catalog 221 based on the content of the dynamic metadata 124 received from the sensor management units 1.

The control portion 11 may also receive, from a user, a change in the operation settings of the first sensor 101 via the network server 2, the user terminals 3, or other information processing apparatuses. At this time, information regarding the form of use in the user data catalog 222 may also be used to designate the content of the change in the operation settings of the first sensor 101. That is to say, the control portion 11 may also receive information regarding the form of use in the user data catalog 222, as a command to give an instruction to change the operation settings of the first sensor 101.

The control portion 11 may then correct the content of the setting data 127 to the content designated by the user, and change the operation settings of the first sensor 101 for acquiring the first sensing data 121. Thus, when one first sensor 101 is shared by a plurality of users, the operation settings of the first sensor 101 can be changed in accordance with a user's request.

Data Transmission Request

Figure 13:
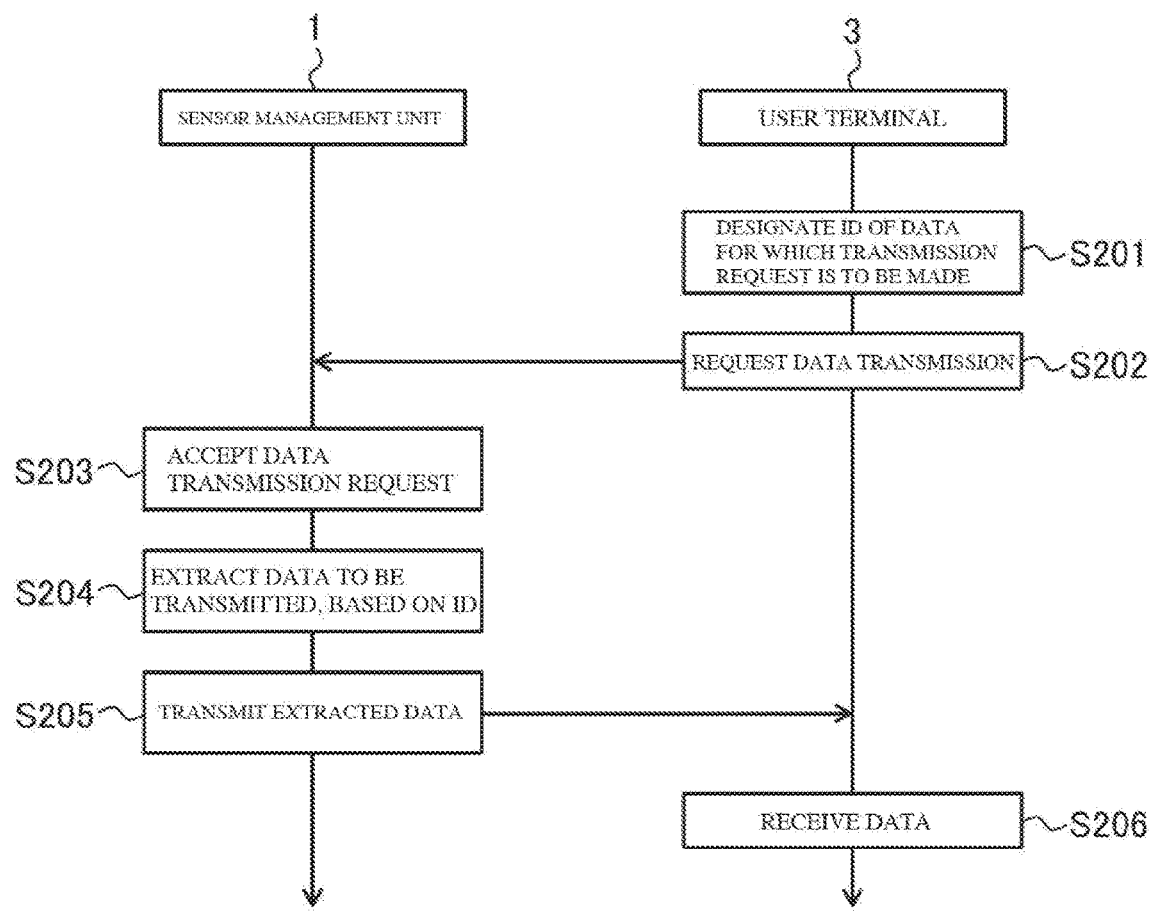
FIG. 13 shows an example of a processing procedure relating to a request for data transmission based on an ID that is performed by the user terminal and the sensor management unit according to the embodiment.

Next, a description will be given, with reference to FIG. 13, of processing by which, after receiving the sensing data ID 128 or the metadata ID 129, the user terminal 3 makes a request to transmit the metadata 123 to 125 or the first sensing data 121 based on the received sensing data ID 128 or metadata ID 129. FIG. 13 shows an example of a processing procedure relating to a data transmission request based on the sensing data ID 128 or the metadata ID 129 performed between the user terminal 3 and the sensor management unit 1, according to this embodiment. However, the processing procedure for requesting data transmission described below is merely an example, and the processes may be modified to the extent possible. As for the processing procedure described below, steps may be omitted, replaced, and added as appropriate, depending on the embodiment.

Steps S201 and S202

First, in step S201, the control portion 31 of the user terminal 3 designate the ID of data for which a transmission request is to be made. In the next step S202, the control portion 31 requests a target sensor management unit 1 (sensor device 100) to transmit data based on the ID designated in step S201.

It is assumed that, as a result of the aforementioned step S105, the first sensing data 121 to which the metadata ID 129 is added has been transmitted from the sensor management unit 1 to the user terminal 3. In this case, basically, the user terminal 3 has the first sensing data 121, but does not have the metadata 123 to 125 corresponding to this first sensing data 121. For this reason, in step S201, the control portion 31 may designate the metadata ID 129 that is added to the first sensing data 121 received from the sensor management unit 1, as the ID of the data for which the transmission request is to be made, as needed. Then, in step S202, the control portion 31 may also request the target sensor management unit 1 to transmit the metadata 123 to 125 corresponding to the target first sensing data 121, based on the metadata ID 129.

Similarly, it is assumed that, as a result of the aforementioned step S105, the metadata 123 to 125 to which the sensing data ID 128 is added has been transmitted from the sensor management unit 1 to the user terminal 3. In this case, basically, the user terminal 3 has the metadata 123 to 125, but does not have the first sensing data 121 corresponding to the metadata 123 to 125. For this reason, in step S201, the control portion 31 may designate the sensing data ID 128 that is added to the metadata 123 to 125 received from the sensor management unit 1, as the ID of the data for which the transmission request is to be made, as needed. Then, in step S202, the control portion 31 may also request the target sensor management unit 1 to transmit the first sensing data 121 corresponding to the target metadata 123 to 125, based on the sensing data ID 128.

Note that the ID of the data for which the transmission request is to be made may be manually designated by the user, or may be automatically designated through information processing performed by the application program 83 or the like. In the case of manually designating the ID of the data for which the transmission request is to be made, the control portion 31 may output a list of the IDs (128, 129) to the output device 35, such as a display, and accept designation of the ID of the data for which the transmission request is to be made, via the input device 34.

Steps S203 to S205

In step S203, the control portion 11 of the sensor management unit 1 accepts, from the user terminal 3, the data transmission request based on the ID. Upon receiving the request to transmit the target first sensing data 121 or metadata 123 to 125 based on the sensing data ID 128 or the metadata ID 129, the control portion 11 advances the processing to the next step S204.

In step S204, the control portion 11 extracts, from the storage portion 12, the first sensing data 121 or the metadata 123 to 125 to be transmitted, based on the received sensing data ID 128 or metadata ID 129. Then, in the next step S205, the control portion 11 operates as the communicating portion 115, and transmits the extracted first sensing data 121 or metadata 123 to 125 to the user terminal 3 that has made the request.

Thus, if a request to transmit the first sensing data 121 specified by the designated sensing data ID 128 is accepted from the user terminal 3, the control portion 11 transmits the first sensing data 121 specified by the designated sensing data ID 128 to the user terminal 3. Similarly, if a request to transmit the metadata 123 to 125 specified by the designated metadata ID 129 is accepted from the user terminal 3, the control portion 11 transmits the metadata 123 to 125 specified by the designated metadata ID 129 to the user terminal 3.

Step S206

In the next step S206, the control portion 31 of the user terminal 3 receives the first sensing data 121 or the metadata 123 to 125. Thus, the processing procedure according to this example operation ends. The user terminal 3 can acquire the metadata 123 to 125 corresponding to the first sensing data 121 that has been received earlier, or the first sensing data 121 corresponding to the metadata 123 to 125 that has been received earlier.

Features

As described above, in this embodiment, when the first sensing data 121 is transmitted from the sensor management unit 1 to the user terminal 3 in the processing in step S105, the metadata ID 129 for identifying the corresponding metadata 123 to 125 is transmitted together. For this reason, through the processing in steps S201 to S206, the user terminal 3 can acquire the metadata 123 to 125 corresponding to the first sensing data 121 that has been received earlier, as needed, based on the received metadata ID 129. Similarly, when the metadata 123 to 125 is transmitted from the sensor management unit 1 to the user terminal 3 in the processing in step S105, the sensing data ID 128 for identifying the corresponding first sensing data 121 is transmitted together. For this reason, through the processing in steps S201 to S206, the user terminal 3 can acquire the first sensing data 121 corresponding to the metadata 123 to 125 that has been received earlier, as needed, based on the received sensing data ID 128. Accordingly, according to this embodiment, usability of the first sensing data 121 and the metadata 123 to 125 in the user terminal 3 can be ensured.

Also, the sensing data ID 128 can be configured to have a smaller data volume than the data volume of the first sensing data 121, and the metadata ID 129 can be configured to have a smaller data volume than the total data volume of the metadata 123 to 125. For this reason, the data traffic in the case of transmitting a combination of the metadata ID 129 and the first sensing data 121 and the data traffic in the case of transmitting of a combination of the sensing data ID 128 and the metadata 123 to 125 are smaller than the data traffic in the case of transmitting a combination of the first sensing data 121 and the metadata 123 to 125. Furthermore, the acquisition of the first sensing data 121 and the metadata 123 to 125 based on the sensing data ID 128 and the metadata ID 129 need not necessarily be always performed, respectively, and the number of times of the acquisition can be lowered. Accordingly, according to this embodiment, the data traffic for transmitting the first sensing data 121 and the metadata 123 to 125 can be reduced without losing the usability of the first sensing data 121 and the metadata 123 to 125.

Also, the metadata according to this embodiment includes at least one of the dynamic metadata 124 and the processed metadata 125. The dynamic metadata 124 indicates an attribute relating to the form of use of the sensor that may dynamically changes over time. The processed metadata 125 indicates information regarding a feature value of the first sensing data 121. Accordingly, if the timing of obtaining the first sensing data 121 differs, the content of the generated dynamic metadata 124 and processed metadata 125 may differ.

For this reason, it is preferable that the dynamic metadata 124 and the processed metadata 125 are generated through the aforementioned step S102 every time the first sensing data 121 is obtained. However, if the dynamic metadata 124 and the processed metadata 125 are generated every time the first sensing data 121 is obtained, the data volume of metadata including the dynamic metadata 124 and the processed metadata 125 increases. Thus, the data traffic for transmitting the first sensing data 121 and the metadata increases.

In this regard, according to this embodiment, even in this case where the data volume of the metadata is likely to increase, the data traffic for transmitting the first sensing data 121 and the metadata can be lowered by using the sensing data ID 128 and the metadata ID 129. That is to say, the present technology, which lowers the data traffic for transmitting the first sensing data 121 and the metadata using the sensing data ID 128 and the metadata ID 129, is more effective in this case where the data volume of metadata is likely to increase due to the metadata including at least one of the dynamic metadata 124 and the processed metadata 125.

§ 4 Example Modifications

Although the embodiment of the present invention has been described in detail, the above description is merely an example of the invention in all respects. Needless to say, various improvements and modifications may be made within the scope of the invention. For example, the following modifications are possible. Note that, in the following description, the same reference numerals are used for the same constituent elements in the above embodiment, and descriptions of the same points as those in the above embodiment are omitted as appropriate. The following modifications may be combined as appropriate.

4.1

In this embodiment, the sensor device 100 (sensor management unit 1) is connected to the network server 2 via a network, and transmits the first sensing data 121 to the user terminal 3 of each user in accordance with the result of matching performed by the network server 2. However, the method for providing the first sensing data 121 need not be limited to this example, and may be decided as appropriate, depending on the embodiment. For example, a configuration may also be employed in which the network server 2 is omitted, and the sensor device 100 provides the first sensing data 121 and the metadata 123 to 125 to the user terminals 3 in accordance with a request from the user terminal 3.

4.2

In step S102 in the above embodiment, the control portion 11 of the sensor management unit 1 can generate the dynamic metadata 124 based on the second sensing data 122 obtained by the second sensor 102. However, the method for generating the dynamic metadata 124 need not be limited to this example, and the control portion 11 may also generate the dynamic metadata 124 without basing it on the second sensing data 122. In this case, the second sensor 102 may be omitted.

4.3

In the above embodiment, the metadata generated in step S102 can include the static metadata 123, the dynamic metadata 124, and the processed metadata 125. However, at least one of the static metadata 123, the dynamic metadata 124, and the processed metadata 125 may be omitted. Also, the metadata may also include other kinds of metadata.

In the above embodiment, one metadata ID 129 is added to one combination of the static metadata 123, the dynamic metadata 124, and the processed metadata 125 corresponding to the first sensing data 121. However, the method for adding the metadata ID need not be limited to this example, and may be decided as appropriate, depending on the embodiment. For example, metadata IDs may be separately added to the respective metadata 123 to 125.

4.4

In the above embodiment, the control portion 11 of the sensor management unit 1 transmits at least one of the first sensing data 121 to which the metadata ID 129 is added and the metadata 123 to 125 to which the sensing data ID 128 is added, through the processing in step S105. However, the content transmitted by the sensor management unit 1 need not be limited to this example. For example, the sensor management unit 1 may also have a mode of collectively transmitting the first sensing data 121 and the metadata 123 to 125, in addition to the mode of performing the processing in the aforementioned step S105.

4.5

In the above embodiment, the first sensing data 121 acquired in step S101, and the dynamic metadata 124 and the processed metadata 125 generated in step S102 are accumulated in the storage portion 12 of the sensor management unit 1. Thus, the sensor management unit 1 may also discard, from the storage portion 12, the first sensing data 121, the dynamic metadata 124, and the processed metadata 125 that have been stored over a predetermined storage period.

4.6

In the above embodiment, the user terminal 3 requests the sensor management unit 1 (sensor device 100) to transmit data, namely the first sensing data 121 or the metadata 123 to 125 based on the sensing data ID 128 or the metadata ID 129, through the processing in steps S201 to S206. However, the location where the first sensing data 121 and the metadata 123 to 125 are stored need not be limited to the sensor management units 1, and may be selected as appropriate, depending on the embodiment. For example, the sensor management unit 1 may transfer the first sensing data 121 and the metadata 123 to 125 to an external storage device, such as a NAS (Network Attached Storage). In this case, the user terminal 3 may request the external storage device to transmit the data.

4.7

In the above embodiment, the content of the provider data catalog 221 is changed based on the dynamic metadata 124, and thus, the sensor management unit 1 includes the catalog change portion 117 as a software module. However, the catalog change portion 117 may be omitted.

In the above embodiment, the sensing data ID 128 and the metadata ID 129 are used to associate the first sensing data 121 and the metadata 123 to 125 with each other. However, the method for associating the first sensing data 121 and the metadata 123 to 125 with each other need not be limited to this example, and may be decided as appropriate, depending on the embodiment. The first sensing data 121 and the metadata 123 to 125 may be associated with each other without depending on the sensing data ID 128 and the metadata ID 129.

In the above embodiment, in step S105, the control portion 11 transmits all of the static metadata 123, the dynamic metadata 124, and the processed metadata 125 at a time. However, in the aforementioned step S105, transmission of at least one of the static metadata 123, the dynamic metadata 124, and the processed metadata 125 may be omitted. For example, while the processing in the aforementioned steps S101 to S106 is repeatedly performed, the control portion 11 may omit transmission of the static metadata 123 after transmitting this static metadata 123 once.

In the above embodiment, the sensor device 100 (sensor management unit 1) may also provide the second sensing data 122 together with or in place of the first sensing data 121, to an external device such as the user terminal 3. In this case, the sensor management unit 1 may also generate the sensing data ID 128 and the metadata 123 to 125 for the second sensing data 122. That is to say, the second sensing data 122 may be dealt with as the "sensing data" of the present invention, together with or in place of the first sensing data 121.

In the above embodiment, the dynamic metadata 124 relates to an attribute that may change in accordance with the form of use, whereas the static metadata 123 relates to an attribute that will not change in accordance with the form of use. The period during which such a change occurs/does not occur may be limited to a period during which sensing data is provided. That is to say, as a result of the matching performed by the network server 2, an attribute of the first sensor 101 that may change during the period during which the first sensing data 121 is provided from the sensor management unit 1 to a target user terminal 3 may be dealt with as the content of the dynamic metadata 124, and an attribute of the first sensor 101 that will not change during this period may be dealt with as the content of the static metadata 123. In this case, the attribute indicated by the static metadata 123 may change (be changed) out of the period during which the first sensing data 121 is provided.

INDEX TO THE REFERENCE NUMERALS

1 . . . Sensor management unit, 11 . . . Control portion, 12 . . . Storage portion, 13 . . . Communication interface, 14 . . . External device interface, 15 . . . Input device, 16 . . . Output device, 17 . . . Drive, 100 . . . Sensor device, 101 . . . First sensor (sensor), 102 . . . Second sensor, 111 . . . Sensing data acquisition portion, 112 . . . Metadata generating portion, 113 . . . Identification code generating portion, 114 . . . Metadata managing portion, 115 . . . Communicating portion, 116 . . . Catalog change portion, 121 . . . First sensing data (sensing data), 122 . . . Second sensing data, 123 . . . Static metadata, 124 . . . Dynamic Metadata, 125 . . . Processed metadata, 126 . . . Management data, 127 . . . Setting data, 128 . . . Sensing data ID (First identification code), 129 . . . Metadata ID (second identification code), 2 . . . Network server, 21 . . . Control portion, 22 . . . Storage portion, 23 . . . Communication interface, 221 . . . Provider data catalog, 222 . . . User data catalog, 3 . . . User terminal, 31 . . . Control portion, 32 . . . Storage portion, 33 . . . Communication interface, 34 . . . Input device, 35 . . . Output device, 81 . . . Sensor management program, 82 . . . Program, 83 . . . Program, 91 . . . Storage medium

The invention claimed is:

1. A sensor management unit comprising a processor configured with a program to perform operations comprising:
  operation as a sensing data acquisition portion configured to acquire sensing data obtained by a sensor observing a target;
  operation as a metadata generating portion configured to generate, for the acquired sensing data, metadata indicating an attribute of the sensor;
  operation as an identification code generating portion configured to generate a first identification code for identifying the sensing data, and a second identification code for identifying the metadata; and
  operation as a communicating portion configured to transmit, to an external device, the sensing data to which the second identification code is added,
  wherein the metadata includes dynamic metadata indicating an attribute of the sensor at a point in time when the sensing data was obtained, the attribute relating to the form of use of the sensor that dynamically changes over time,
  the dynamic metadata is an attribute relating to operation settings of the sensor, and
  the attribute relating to operation settings of the sensor includes at least one of a set value of a measurement range, a set value of a resolution in the measurement range, a set value of a sampling frequency of the sensor.

2. The sensor management unit according to claim 1, wherein the processor is configured with the program such that operation as the identification code generating portion comprises generating the first identification code and the second identification code, using a universal unique identifier or a global unique identifier.

3. The sensor management unit according to claim 2, wherein the metadata includes at least one of dynamic metadata indicating an attribute relating to a form of use of the sensor that may dynamically change over time, and processed metadata relating to a feature value of the sensing data, the processed metadata being generated by analyzing the sensing data.

4. The sensor management unit according to claim 2, wherein, the processor is configured with the program such that,
  in response to the sensor management unit receiving, from the external device, a request for transmitting the sensing data accompanied by a designation of the first identification code, the communicating portion transmits, to the external device, the sensing data specified by the designated first identification code, and
  in response to the sensor management unit receiving, from the external device, a request for transmitting the metadata accompanied by a designation of the second identification code, the communicating portion comprises transmitting, to the external device, the metadata specified by the designated second identification code.

5. The sensor management unit according to claim 2, wherein the processor is configured with the program to perform operations further comprising:
  operation as a metadata managing portion configured to manage the generated metadata in association with the sensing data.

6. A sensor device comprising:
  the sensor management unit according to claim 2; and
  the sensor.

7. The sensor management unit according to claim 1, wherein the metadata includes processed metadata relating to a feature value of the sensing data, the processed metadata being generated by analyzing the sensing data.

8. The sensor management unit according to claim 7, wherein the processor is configured with the program such that,
  in response to the sensor management unit receiving, from the external device, a request for transmitting the sensing data accompanied by a designation of the first identification code, the communicating portion transmits, to the external device, the sensing data specified by the designated first identification code, and
  in response to the sensor management unit receiving, from the external device, a request for transmitting the metadata accompanied by a designation of the second identification code, the communicating portion comprises transmitting, to the external device, the metadata specified by the designated second identification code.

9. The sensor management unit according to claim 7, wherein the processor is configured with the program to perform operations further comprising:
  operation as a metadata managing portion configured to manage the generated metadata in association with the sensing data.

10. A sensor device comprising:
  the sensor management unit according to claim 7; and
  the sensor.

11. The sensor management unit according to claim 1, wherein the processor is configured with the program such that, in response to the sensor management unit receiving, from the external device, a request for transmitting the sensing data accompanied by a designation of the first identification code, the communicating portion comprises transmitting, to the external device, the sensing data specified by the designated first identification code, and in response to the sensor management unit receiving, from the external device, a request for transmitting the metadata accompanied by a designation of the second identification code, the communicating portion comprises transmitting, to the external device, the metadata specified by the designated second identification code.

12. The sensor management unit according to claim 11, wherein the processor is configured with the program to perform operations further comprising:

operation as a metadata managing portion configured to manage the generated metadata in association with the sensing data.

13. A sensor device comprising:
the sensor management unit according to claim 11; and
the sensor.

14. The sensor management unit according to claim 1, wherein the processor is configured with the program to perform operations further comprising:

operation as a metadata managing portion configured to manage the generated metadata in association with the sensing data.

15. A sensor device comprising:
the sensor management unit according to claim 14; and
the sensor.

16. A sensor device comprising:
the sensor management unit according to claim 1; and
the sensor.

17. A computer-implemented sensor management method comprising:

acquiring sensing data obtained by a sensor observing a target;

generating, for the acquired sensing data, metadata indicating an attribute of the sensor;

generating a first identification code for identifying the sensing data, and a second identification code for identifying the metadata; and transmitting, to an external device, the sensing data to which the second identification code is added, wherein the metadata includes dynamic metadata indicating an attribute of the sensor at a point in time when the sensing data was obtained, the attribute relating to the form of use of the sensor that dynamically changes over time, the dynamic metadata is an attribute relating to operation settings of the sensor, and the attribute relating to operation settings of the sensor includes at least one of a set value of a measurement range, a set value of a resolution in the measurement range, a set value of a sampling frequency of the sensor.

18. A non-transitory computer-readable storage medium storing a sensor management program, the sensor management program configured to cause a computer to perform operations comprising:

acquiring sensing data obtained by a sensor observing a target;

generating, for the acquired sensing data, metadata indicating an attribute of the sensor;

generating a first identification code for identifying the sensing data, and a second identification code for identifying the metadata; and transmitting, to an external device, the sensing data to which the second identification code is added, wherein the metadata includes dynamic metadata indicating an attribute of the sensor at a point in time when the sensing data was obtained, the attribute relating to the form of use of the sensor that dynamically changes over time, the dynamic metadata is an attribute relating to operation settings of the sensor, and the attribute relating to operation settings of the sensor includes at least one of a set value of a measurement range, a set value of a resolution in the measurement range, a set value of a sampling frequency of the sensor.

* * * * *